US012752555B2

(12) United States Patent
Moscato et al.

(10) Patent No.: US 12,752,555 B2
(45) Date of Patent: Oct. 6, 2026

(54) SYSTEMS AND METHODS FOR POSITIONING PRINTHEADS OF A PRINTING APPARATUS

(71) Applicant: Cryovac, LLC, Charlotte, NC (US)

(72) Inventors: Anthony Vincent Moscato, North Tonawanda, NY (US); Theodore F. Cyman, Grand Island, NY (US); George A. Alessi, Buffalo, NY (US); Kent David Jayme, Grand Island, NY (US)

(73) Assignee: Cryovac, LLC, Charlotte, NC (US)

(*) Notice: Subject to any disclaimer, the term of this patent is extended or adjusted under 35 U.S.C. 154(b) by 158 days.

(21) Appl. No.: 18/722,804

(22) PCT Filed: Dec. 22, 2022

(86) PCT No.: PCT/US2022/053760

§ 371 (c)(1),
(2) Date: Jun. 21, 2024

(87) PCT Pub. No.: WO2023/122245

PCT Pub. Date: Jun. 29, 2023

(65) Prior Publication Data

US 2025/0042189 A1 Feb. 6, 2025

Related U.S. Application Data

(60) Provisional application No. 63/293,189, filed on Dec. 23, 2021.

(51) Int. Cl.

| | |
|---|---|
| ***B41J 25/00*** | (2006.01) |
| ***B41J 2/51*** | (2006.01) |
| ***B41J 25/34*** | (2006.01) |

(52) U.S. Cl.

CPC ............... *B41J 25/003* (2013.01); *B41J 2/51* (2013.01); *B41J 25/005* (2013.01); *B41J 25/34* (2013.01)

(58) Field of Classification Search

CPC ........ B41J 25/003; B41J 25/005; B41J 25/34; B41J 2/51

See application file for complete search history.

(56) References Cited

U.S. PATENT DOCUMENTS

| | | | |
|---|---|---|---|
| 2008/0186353 A1 | 8/2008 | Parks et al. | |
| 2011/0122184 A1 | 5/2011 | Kimura et al. | |
| 2013/0215198 A1 | 8/2013 | Izawa et al. | |
| 2015/0202867 A1 | 7/2015 | Koga et al. | |
| 2019/0118467 A1 | 4/2019 | Neboian et al. | |

FOREIGN PATENT DOCUMENTS

| | | | |
|---|---|---|---|
| EP | 3067208 | 9/2016 | |
| EP | 3067208 B1 * | 8/2018 | ............. B41J 2/505 |

* cited by examiner

*Primary Examiner* — Jason S Uhlenhake
(74) *Attorney, Agent, or Firm* — Jason R. Womer

(57) ABSTRACT

Systems and methods for printing on a polymeric film web are disclosed in which first and second adjacent printhead holders slidably are disposed on at least one rail and a projection extends from the first printhead holder toward the second printhead holder. A linear actuator is operated to cause the printhead holders to move between a first position in which the projection contacts the second printhead holder and a second position in which the projection is not in contact with the second printhead holder and the first and second printhead holders are separated by predetermined distances.

17 Claims, 29 Drawing Sheets

SYSTEMS AND METHODS FOR POSITIONING PRINTHEADS OF A PRINTING APPARATUS

CROSS-REFERENCE TO RELATED APPLICATIONS

The present application claims benefit of priority to, U.S. Provisional Patent Application Ser. No. 63/293,189 filed on Dec. 23, 2021, and entitled "SYSTEMS AND METHODS FOR POSITIONING PRINTHEADS OF A PRINTING APPARATUS" The entire contents of this application are incorporated herein by reference.

FIELD OF DISCLOSURE

The present subject matter disclosed herein relates to printing apparatus, and more particularly, to a printing apparatus that comprises systems and methods for positioning printheads of the printing apparatus.

BACKGROUND

High speed printing systems have been developed for printing on a substrate, such as a web of heat-shrinkable polymeric film. Such a material typically exhibits both elasticity and plasticity characteristics that depend upon one or more applied influences, such as force, heat, chemicals, electromagnetic radiation, etc. Materials deposited on the web by an imaging unit of the printing system are typically dried before additional material is deposited by a subsequent imaging unit. Some webs, such as a heat-shrinkable polymeric film, begin to shrink, deform, or otherwise become damaged if heated beyond a critical temperature. Drying of one or more material(s) deposited on such webs must be monitored and controlled so that sufficient heat is applied to dry the material deposited thereon without raising the temperature of the web beyond the critical temperature.

The discussion above is merely provided for general background information and is not intended to be used as an aid in determining the scope of the claimed subject matter.

SUMMARY

According to one aspect, a system for printing on a polymeric film web includes at least one rail, a linear actuator, first and second adjacent printhead holders slidably disposed on the at least one rail, and a projection extending from the first printhead holder toward the second printhead holder. Operating the linear actuator causes the printhead holders to move between a first position in which the projection contacts the second printhead holder and a second position in which the projection is not in contact with the second printhead holder and the first and second printhead holders are separated by predetermined distances.

According to another aspect, a method for printing on a polymeric film web includes disposing first and second adjacent printhead holders slidably on at least one rail and operating a linear actuator to move the first and second printhead holders between a first position in which a projection extending from the first printhead holder contacts the second printhead holder and a second position in which the projection is not in contact with the second printhead holder and the first and second printhead holders are separated by predetermined distances.

According to a further aspect, a system for printing on a clear polymeric film web at a particular resolution includes a web transport, a first printhead, and a second printhead. The web transport transports the web along a process direction. The first printhead has a first nozzle plate having a first nozzle and a first side edge, wherein the first nozzle plate is free of nozzles between the first nozzle and the first side edge. The second printhead has a second nozzle plate that faces the web and has a second side edge and a second nozzle, wherein the second nozzle plate is free of nozzles between the second nozzle and the second side edge. In addition, the second side edge is parallel and proximate the first side edge. The first nozzle and the second nozzle are separated along a width direction perpendicular to the process direction by one nozzle pitch determined by the particular resolution and the first side edge and the second side edge are separated in the width direction by a distance greater than one nozzle pitch.

Other aspects and advantages will become apparent upon consideration of the following detailed description and the attached drawings wherein like numerals designate like structures throughout the specification.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

Figure 8:
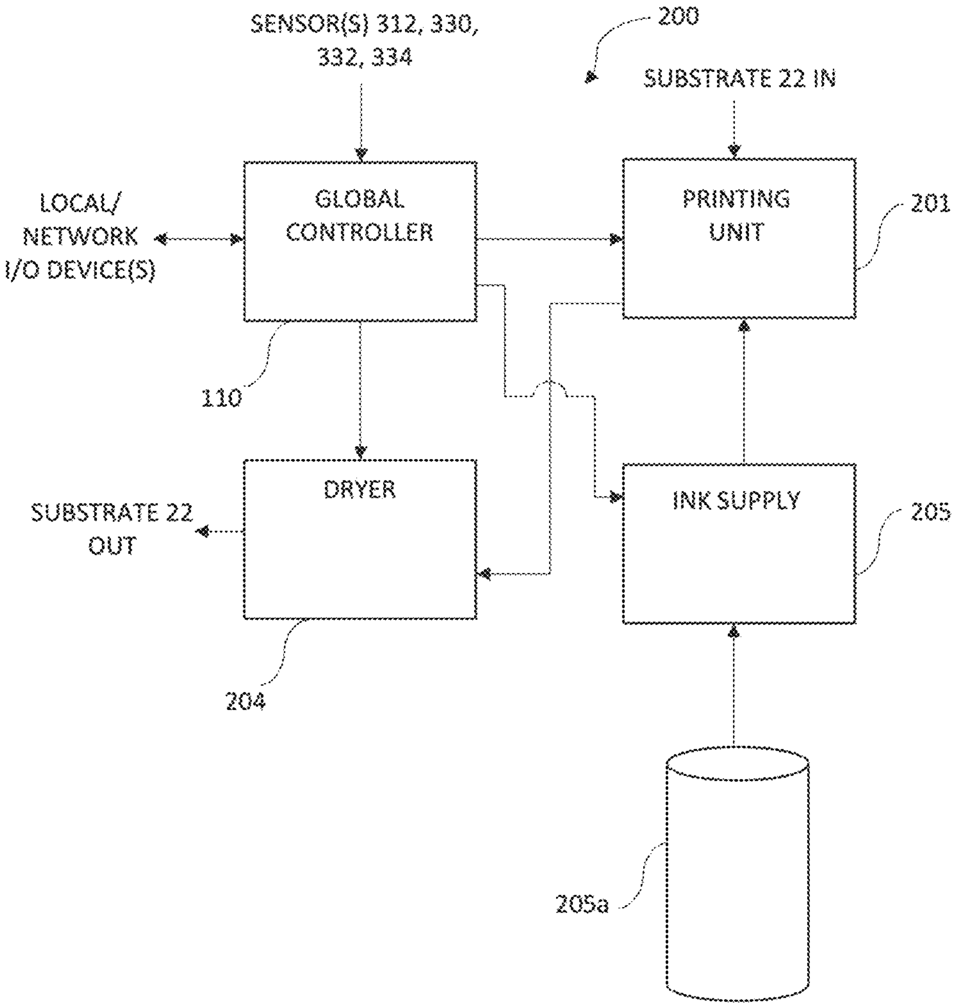
FIG. 8 is a block diagram of a global controller in conjunction with various devices of a print system including a main ink reservoir, and ink supply system, a printing unit and a dryer and interconnections therebetween.
Figure 9:
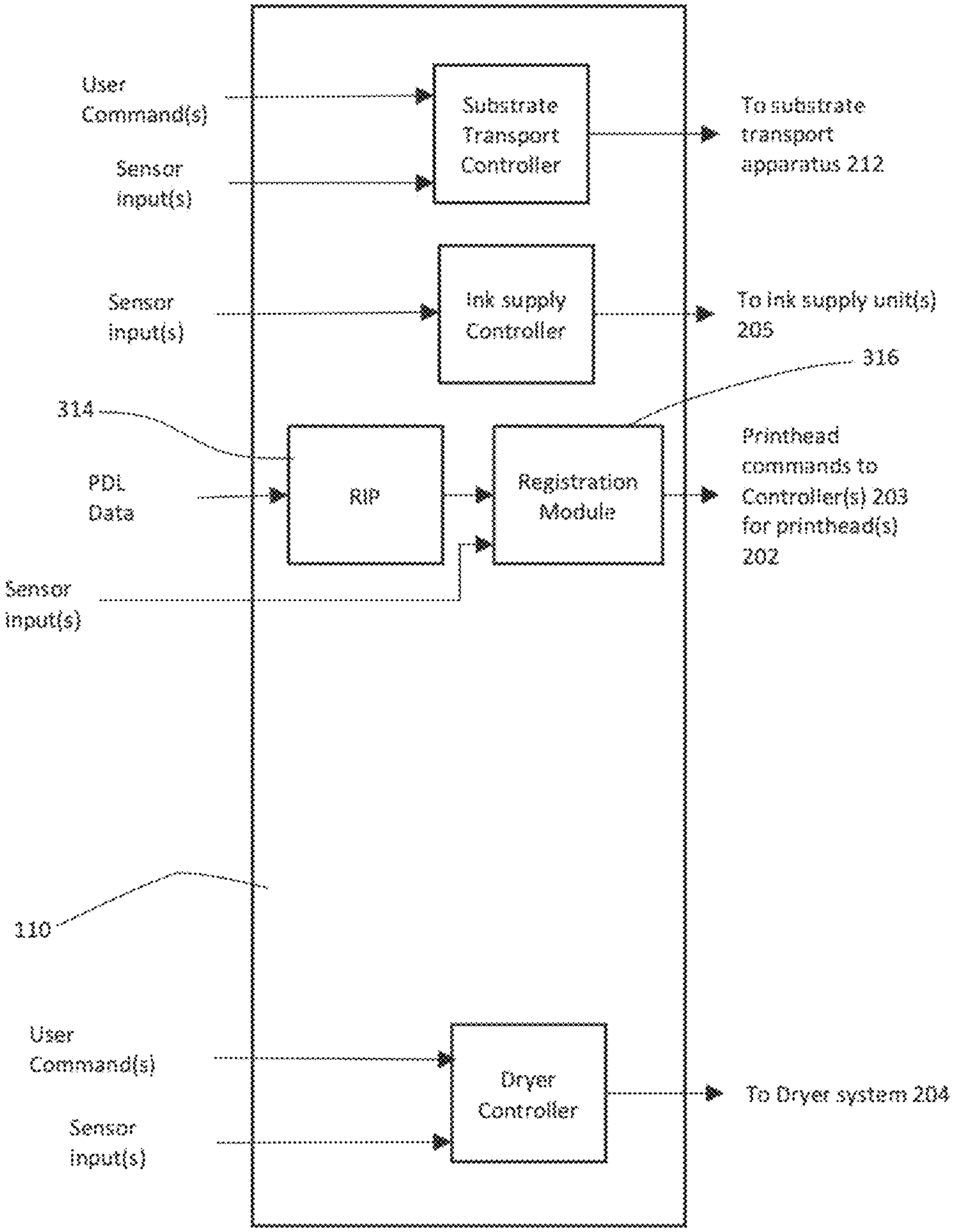
FIG. 9 is a block diagram of portions of the global controller of FIG. 8.

A flexible substrate 22 in the form of a web, of, e.g., thermoplastic polymer material, is passed through one or more printing modules and receives ink, which is dried to obtain a printed web that may be further processed to form printed individual units, such as bags. The bags may be adapted to receive one or more articles therein. More particularly, FIGS. 8 and 9 illustrate a global controller 110 operable to control various elements as described hereinafter and FIGS. 1-7 illustrate an embodiment of a module 200 responsive to the global controller 110, and, optionally, other devices, that prints aqueous substances on the flexible substrate 22. (It may be noted that FIGS. 1-7 are illustrated with certain tubing and fluid conduits omitted therefrom for the sake of clarity). The print module 200 includes one or more printing units 201 each comprising one or more ink jet printheads 202, (seen in detail in FIG. 5), with associated printhead controllers 203. In the illustrated embodiment, each of four controllers 203*a*-203*d* is associated with and operates one of four printheads 202*a*-202*d*, respectively. The print module 200 further includes ink supply apparatus, such as one or more ink supply units 205 that receive ink from a main ink reservoir 205*a* shown in FIGS. 8 and 9, a dryer system 204 comprising one or more dryers (best seen in FIG. 6), and a substrate transport apparatus 212 that controls the continuous movement of the substrate 22 at a throughput speed of, for example, at least 500 feet per minute. The substrate may instead be transported at a faster or slower throughput speed, e.g., 1000 feet per minute, as desired. The global controller 110 is responsive to one or more sensors and controls the substrate transport apparatus 212, the ink supply unit(s) 205, the printheads 202 via the controllers 203, and the dryer system 204. The global controller 110 may also control additional elements and may be implemented by one or more suitably programmed computer-based devices, each comprising, e.g., a desktop or laptop computer, a device using one or more application specific integrated circuits (ASIC's) and/or field-programmable gate arrays (FPGA's), a tablet, a smartphone, etc. and/or combinations thereof. The global controller 110 may be unitary or may be distributed across one or more networks. As seen in FIG. 9, the global controller 110 is coupled to local and/or networked interfaces, such as a keyboard, a mouse, a display, a touchscreen, a local area network (LAN), a wide area network (WAN) such as the Internet, etc. The global controller 110 is responsive to commands supplied thereto by a user via the local and/or networked interfaces.

In addition to the foregoing, the print module 200 includes one or more structural elements that provide support for various conduits and other elements and enclosures that provide spaces to house various elements, as necessary and/or desirable.

Figure 1:
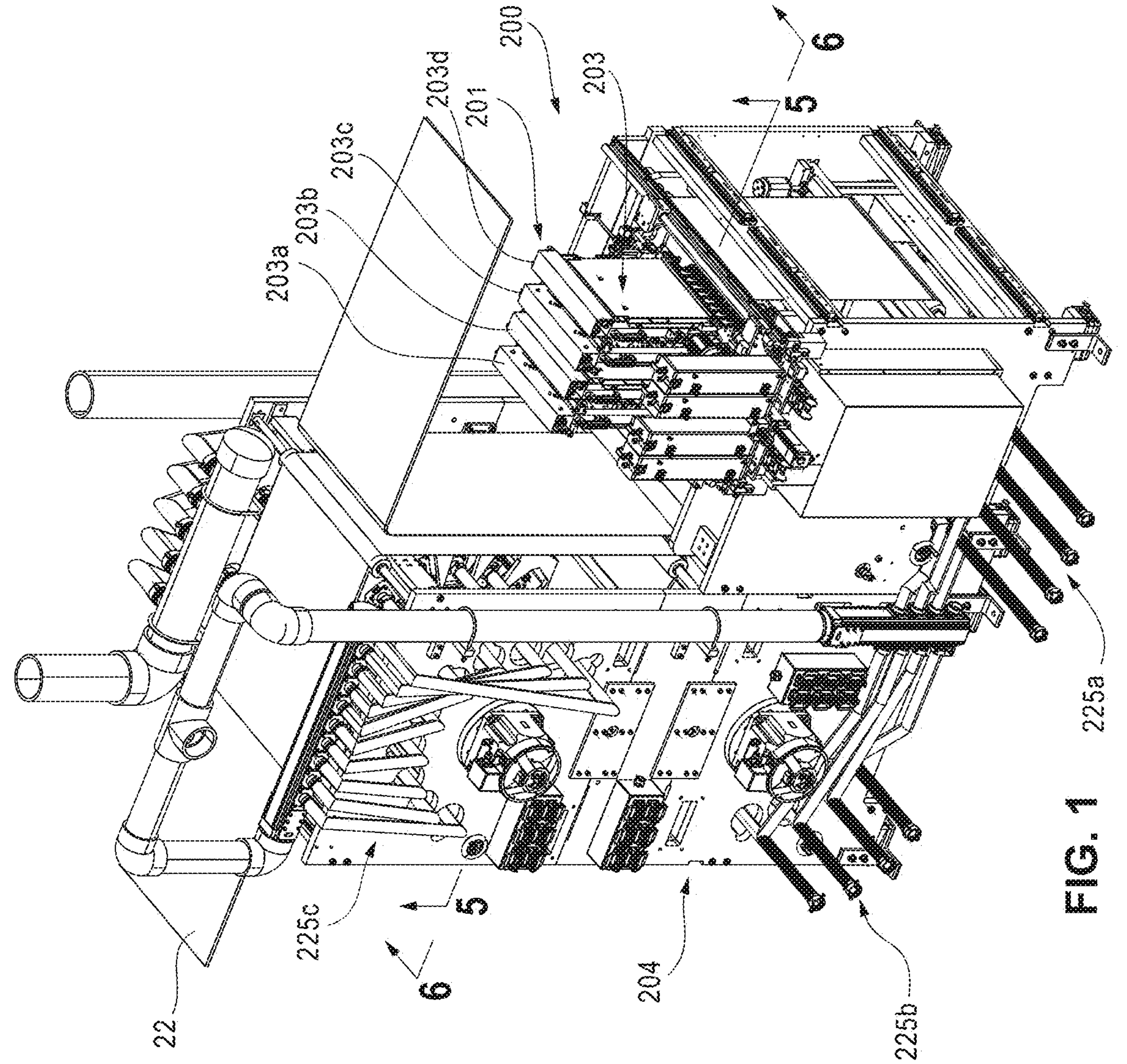
FIGS. 1, 2, and 3 are various isometric views with portions omitted therefrom of an embodiment of a module for printing one or more substances on a flexible substrate.
Figure 2:
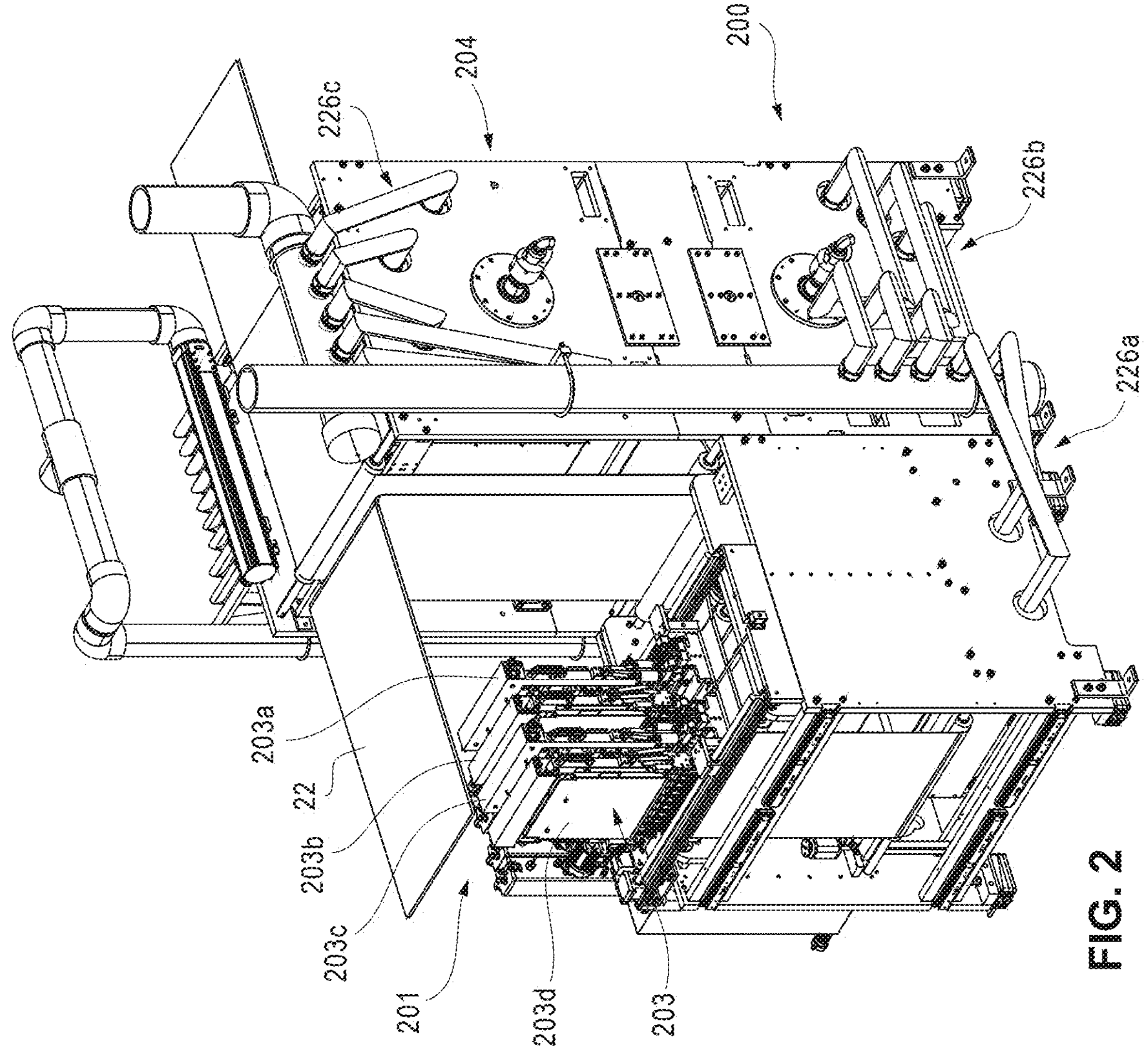
Figure 3:
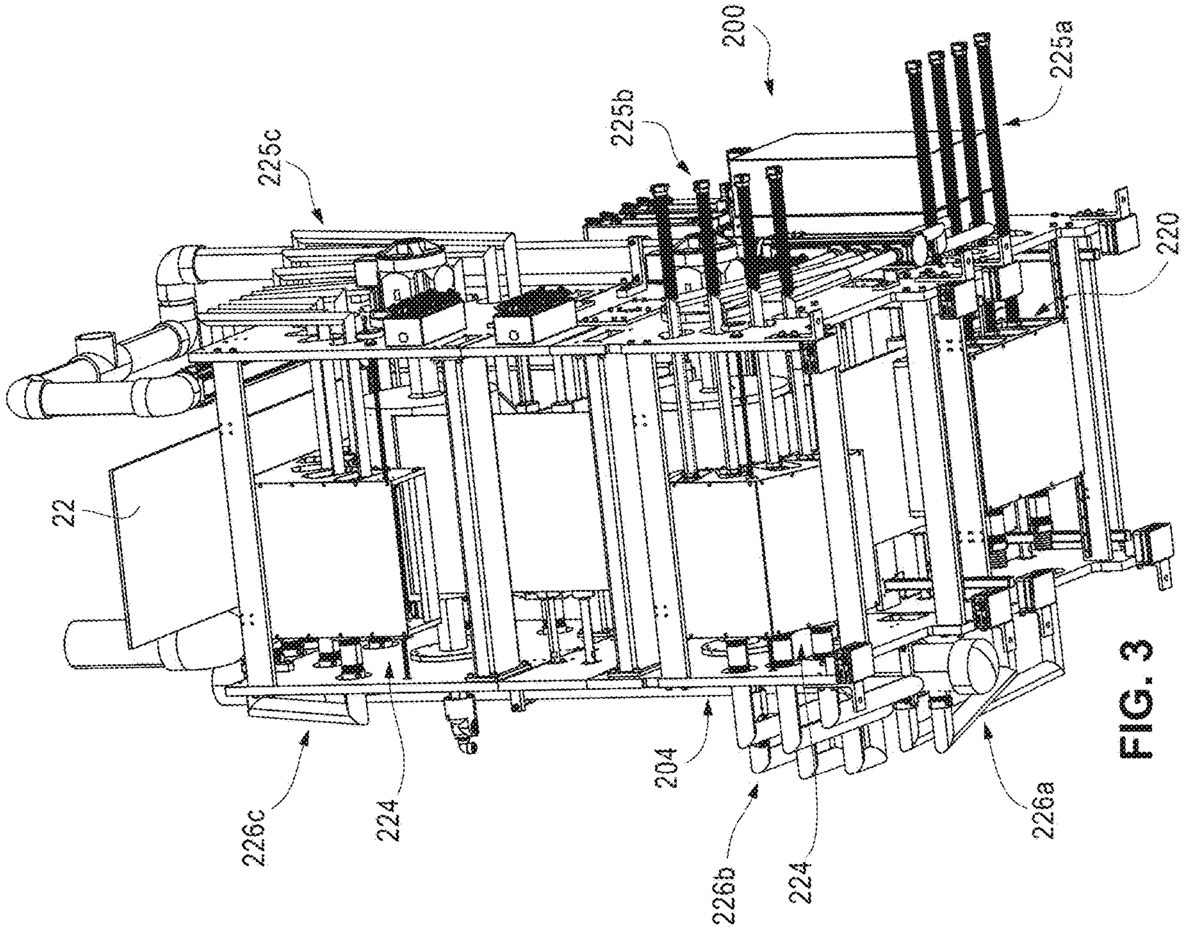
Figure 4:
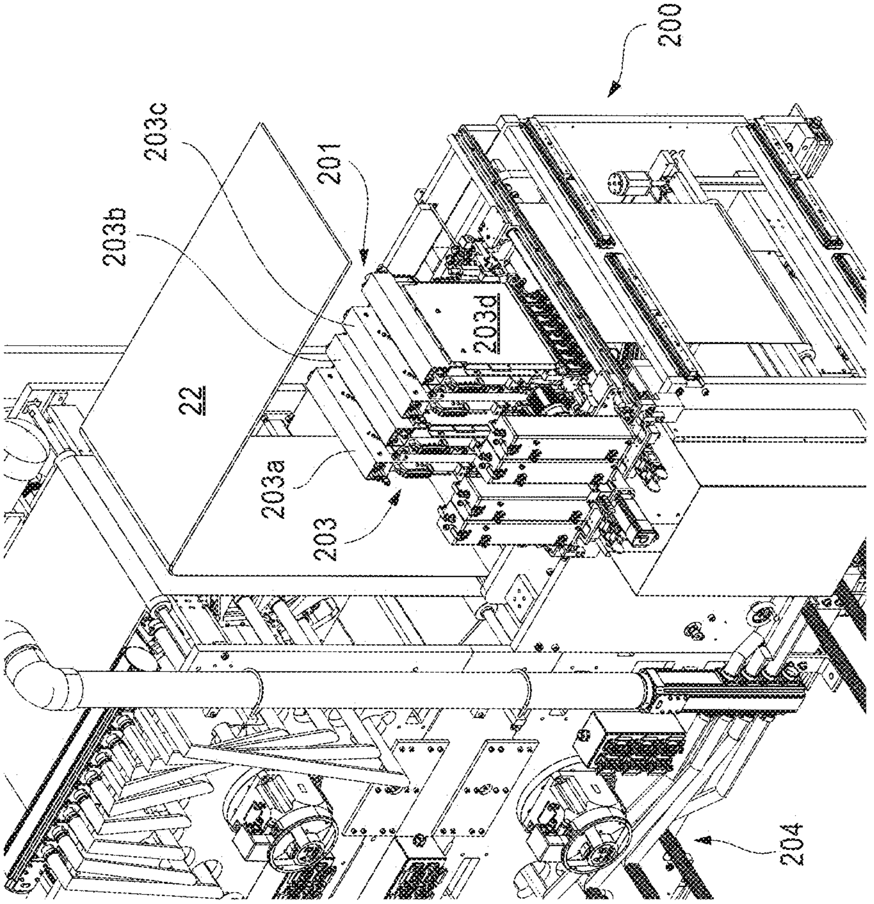
FIG. 4 is an enlarged, fragmentary, isometric view of the embodiment shown in FIG. 1.
Figure 5:
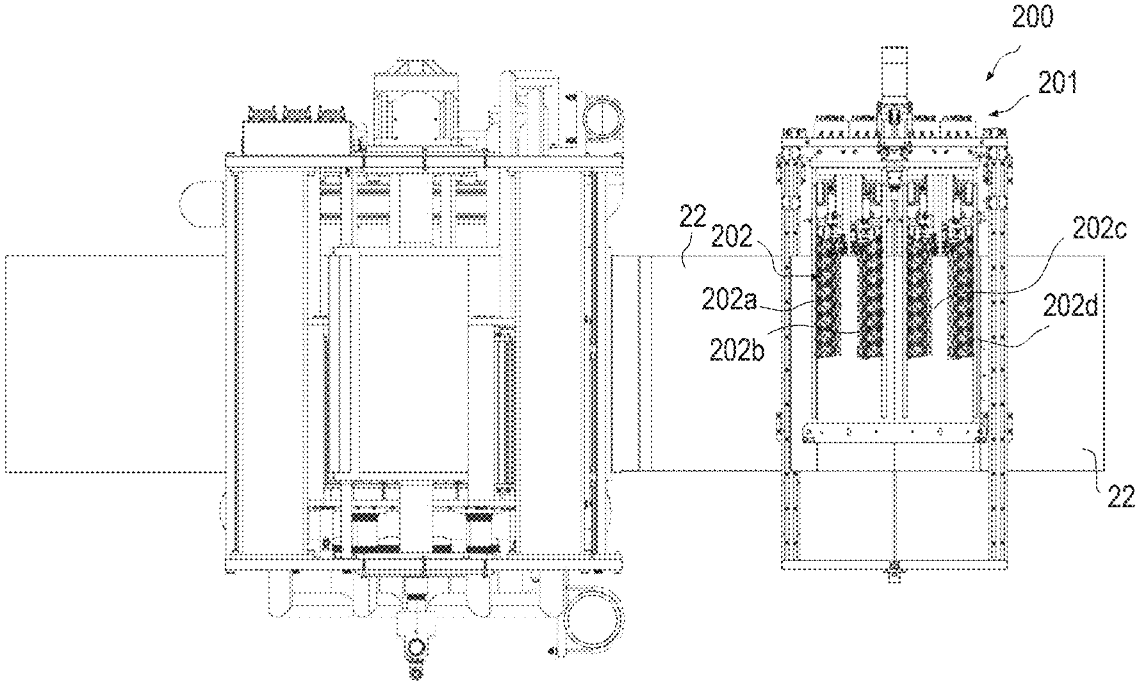
FIG. 5 is a sectional view taken generally along the lines 5-5 of FIG. 1.
Figure 6:
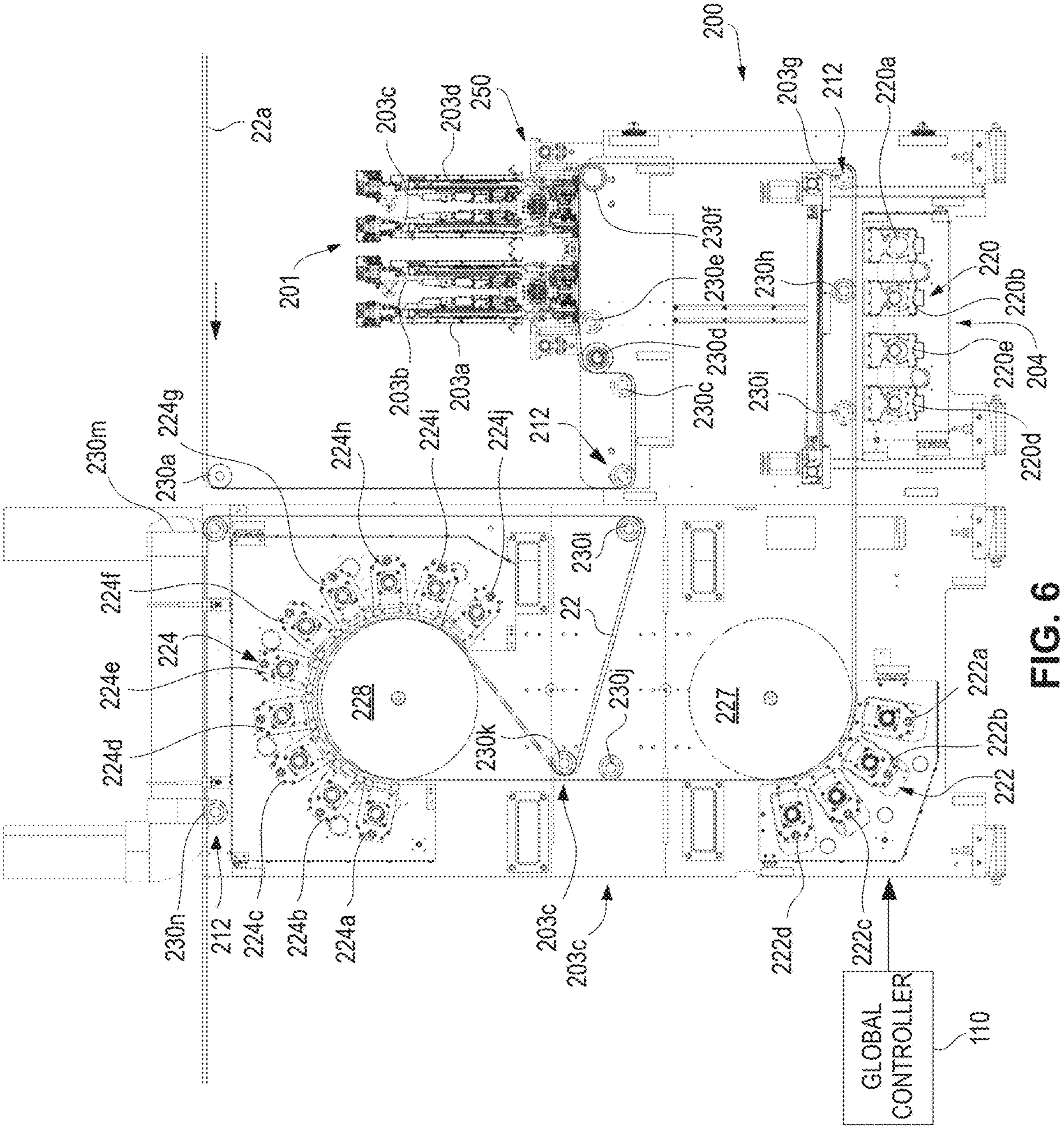
FIG. 6 is a sectional view taken generally along the lines 6-6 of FIG. 1.

As seen specifically in FIG. 6, the dryer system 204 comprises first, second, and third sets of dryers 220, 222, and 224, respectively. The dryer sets 200, 222, and 224 include dryers 220*a*-220*d* and 222*a*-222*d* and 224*a*-224*j*, respectively, (FIG. 6) successively arranged in the FIGS. in sequence of substrate movement. Some or all of the dryers 220*a*-220*d*, 222*a*-222*d*, and/or 224*a*-224*j* may comprise one or more dryer components, such as heaters and/or blowers, or may simply comprise passive conduits or radiators, and may receive dryer air from inlet conduit sets 225*a*-225*c* (FIG. 1) and may exhaust air through exhaust conduit sets 226*a*-226*c* (FIG. 2). The dryer system 204 further comprises first and second rotatable drums 227 and 228 disposed opposite the sets 222 and 224, respectively. The drums 227, 228 control substrate tension. Further, rollers 230*a*-230*g*, some or all of which may comprise driven or idler rollers, are arranged as seen in FIG. 6 in successive manner in order of substrate movement through the dryer system 204.

The dryers are controlled to dry the ink applied to the substrate 22 in a fashion to minimize deformation of the substrate as much as possible.

The printing unit 201 is disposed at a print station 250 accessible by an operator. As seen in FIG. 6, the print station 250 includes one or more idler or driven rollers 230*d*-230*f* successively arranged in the FIG. in order of substrate movement that transport the substrate through the printing unit 201 opposite the printheads 202, which are operated to deposit aqueous ink onto a single side 22*a* of the substrate 22 so as to effectuate simplex printing.

Figure 7:
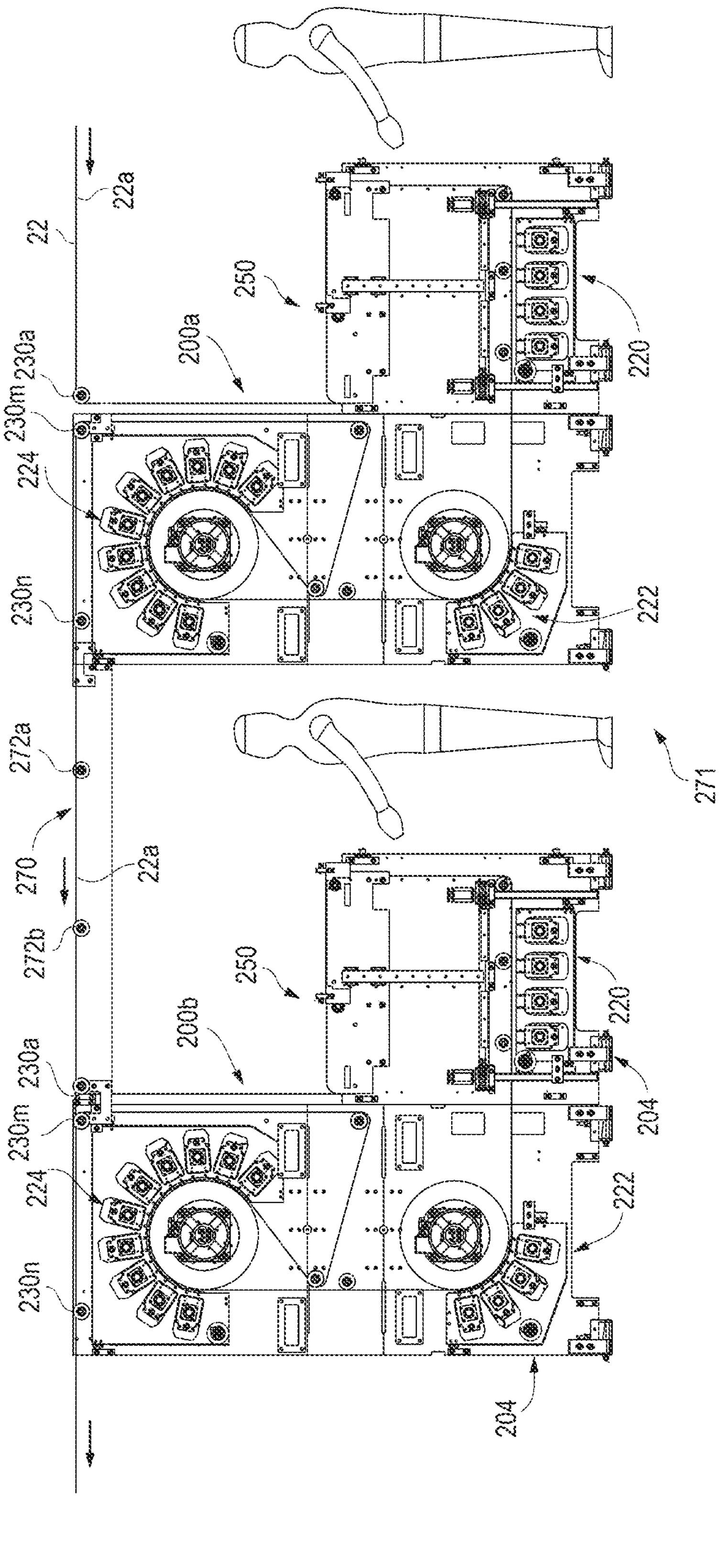
FIG. 7 is a side elevational view with portions omitted therefrom of two of the modules of FIG. 1.

FIG. 7 illustrates an embodiment in which two of the print modules 200 shown in FIG. 6 are disposed in a frame 270 that allows room for one or two operators to control the modules. (It may be noted that the frame 270 may form a part of or be associated with one or both of the modules or may be separate from both modules. Also, the printheads 202 and associated controllers are not shown in FIG. 7 and certain reference numbers for elements visible in both FIGS. 6 and 7 are not shown in FIG. 7 for clarity.) More specifically, first and second modules 200*a*, 200*b*, each identical to the module 200, are disposed in spaced relationship in the frame 270 to form a printing system 271. As should be evident from FIG. 7, the modules 200*a*, 200*b* print on the substrate 22 in serial fashion. The frame 270 includes one or more idler and/or driven rollers 272*a*, 272*b* that transport the substrate 22 through the frame 270 and between the modules 200*a*, 200*b*. In the illustrated embodiment, the rollers 272*a* and 272*b* are successively arranged in FIG. 7 in the direction of substrate movement. Thus, as seen in FIG. 7 and also referring to FIG. 6, the substrate enters the module 200*a* and passes over/about the rollers 230*a*-230*c* of the module 200*a*, and thereafter passes over the rollers 230*d*-230*f* in the print station 250 of the module 200*a*. In the process of traveling from the roller 230*d* to the roller 230*f*, the printheads 202 deposit aqueous ink on the side 22*a* of the substrate. The ink that is deposited may be any individual "color(s)" or combination(s) thereof, including C (cyan), M (magenta), Y (yellow), K (key, i.e., black), O (olive), V (violet), G (green), S (a spot color), white, a clear or other primer, UV (ultraviolet), a magnetic ink, etc. In an embodiment, the module 200*a* prints a clear primer and/or a white panel and other printed content on successive portions of the substrate 22 at 1200 dpi or any other resolution.

Following application of ink, the substrate 22 traverses the rollers 230*g*-230*i* of the module 200*a* and passes the first set of dryers 220 of such module. The printed side 22*a* of the substrate 22 is presented toward a first stage of the dryer system 204 comprising the dryers 220*a*-220*d*, which are operated as pinning devices and initiate the drying process. As seen in FIG. 6, the substrate 22 travels to the drum 227 and thereafter to the drum 228 via the roller 230*j*, and the substrate 22 is then guided by the rollers 230*k*-230*n* and out of the module 220*a*. As should be evident, the side 22*a* is sequentially presented to second and third stages of the dryer system 204 comprising the dryers 222*a*-222*d* and 224*a*-224*k*, respectively, to complete the drying process.

As shown in FIG. 7, the substrate continues over the rollers 272*a* and 272*b* to the module 200*b* at which the side 22*a* of the substrate 22 receives further printed content as described above in connection with the module 200*a*. The printed content on the side 22*a* is dried as described above by a dryer unit 204 of the second module 200*b*. The printed substrate may be transported out of the frame 270 for further handling, printing, processing, and/or storage, as necessary or desirable.

In an embodiment, the module 200*b* of FIG. 7 prints up to four "colors" (as noted above) on the side 22*a* of the flexible substrate 22. Thus, for example, the module 200*b* may print, for example, C, M, Y, and/or K at a resolution of 1200 dpi or any other resolution in register with the successive portions of the substrate 22 that are printed by the module 200*a*. In a further example, the module 200*a* may print primary process colors C, M, Y, K at any resolution on successive portions of the substrate 22 and the module 200*b* may print secondary process colors O, V, G, and an optional spot color S in register with and atop and/or in combination with the primary process colors C, M, Y, K on the same side 22*a* of the substrate 22. Alternatively, in such an embodiment, it may be advantageous and/or desirable that both of the modules 200*a*, 200*b* print primary and/or secondary process colors or any other same or different "color(s)" either at the same resolution or different resolutions, in-register or out-of-register, as necessary or desirable.

If more "colors" and/or different resolutions are to be printed, additional printheads and associated printhead controllers and ink supplies can be added to the module(s) 200*a*, 200*b*. Alternatively, a turn bar other substrate inversion device (not shown) may be provided downstream of the module 200*b* of FIG. 7 and one or two or more additional modules identical to the module 200 could be provided downstream of the turn bar or other substrate inversion device to permit duplex mode printing in four or eight or more "colors" on a side 22*b* of the substrate 22.

In addition to the foregoing, the module 200 includes one or more structural elements that provide support for various conduits and other elements and enclosures that provide spaces to house various elements, as necessary and/or desirable.

Figure 10:
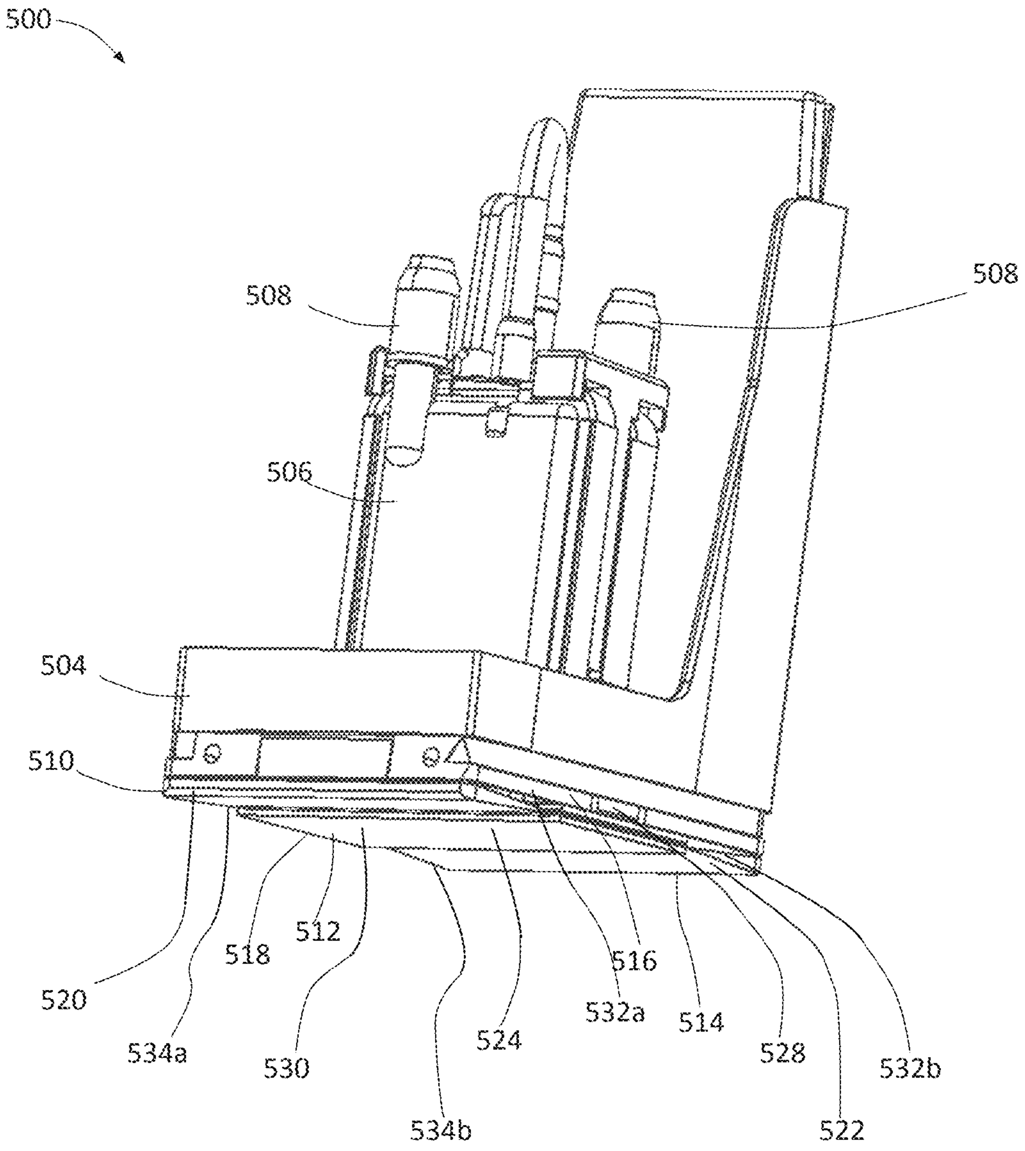
FIG. 10 is an isometric bottom view of a printhead and associated printhead holder usable in any of the modules described herein.
Figure 11:
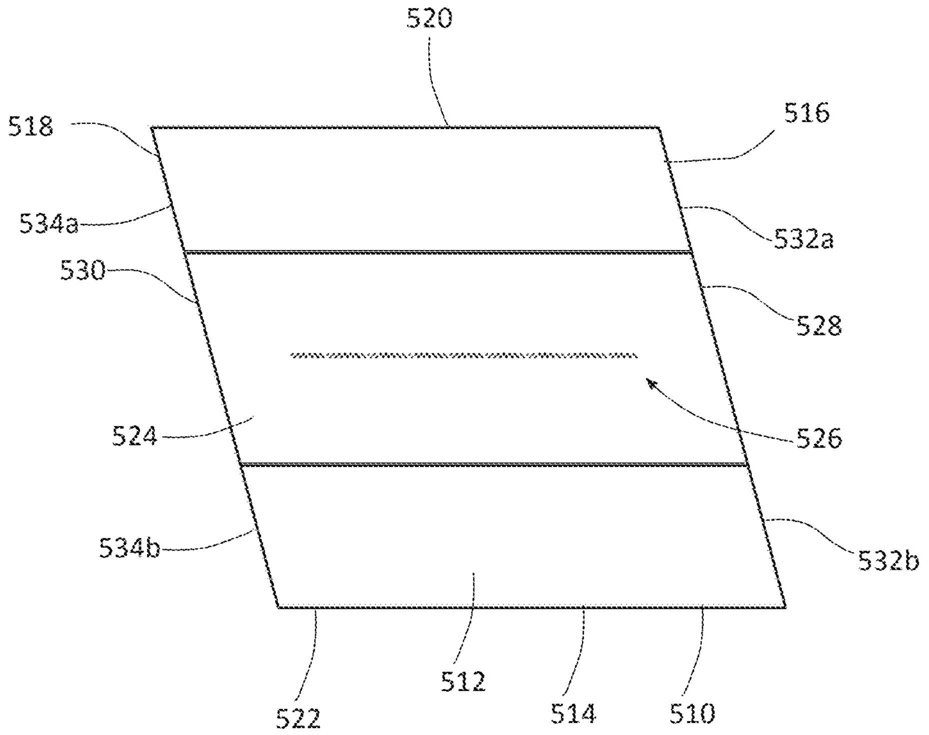
FIG. 11 is a bottom elevational view of a bottom face of the printhead of FIG. 10.

Referring to FIGS. 10 and 11, in one embodiment, each printhead 500 (which may be the printhead 202 described above or another printhead) disposed in a printhead holder 502 of the printing unit 201 of the print module 200 includes a printhead housing 504 and an ink chamber 506. The ink chamber 506 includes one or more ink supply ports 508 that may be coupled to a source of ink (not shown) via a corresponding ink supply line (not shown).

The printhead 500 includes a bottom portion 510 having a bottom face 512. The printhead 500 is disposed in the printhead holder 502 such that the bottom face 512 faces the substrate 22. The bottom portion 510 (and thus the bottom face 512) is defined by a first side edge 516, a second side edge 518, a front edge 520, and a rear edge 522. In addition, the bottom portion 510 includes a nozzle plate 524 having a plurality of nozzles 526 disposed between a first side edge 528 and a second side edge 530 of the nozzle plate 526. During printing, ink in the ink chamber 506 is ejected from one or more of the plurality of nozzles 526 disposed in the nozzle plate 524 as the substrate 22 is transported past such plurality of nozzles 526.

In some embodiments, the first side edge 516 and the second side edge 518 of the bottom face 512 are substantially parallel and the front edge 520 and the rear edge 522 of the bottom face 512 are substantially parallel.

In some embodiments, the first side edge 516 of the bottom face 512 comprises a first side edge portion 532*a*, the first side edge 528 of the nozzle plate 524, and a second side edge portion 532*b*, all of which are substantially collinear. Similarly, the second side edge 518 of the bottom face 512 comprises a first side edge portion 534*a*, the second side edge R126 of the nozzle plate 524, and a second side edge portion 534*b*, all of which are also collinear.

In some cases, the first side edge 516, the second side edge 518, the front edge, 520, and the rear edge 522 of the bottom face 512 define a perimeter 514 of the bottom face 512. In some embodiments, such perimeter 514 is a parallelogram with the first side edge 516 forming oblique angles with the front and rear edges 520, R118 and the second side edge 518 also forming oblique angles with the front and rear edges 520, 522. It should be apparent to one who has ordinary skill in the art that the perimeter 514 may have a different shape including, for example, a different polygonal shape (square, rectangle, hexagon, etc.) or even a shape having one or more non-linear segment(s).

Figure 12:
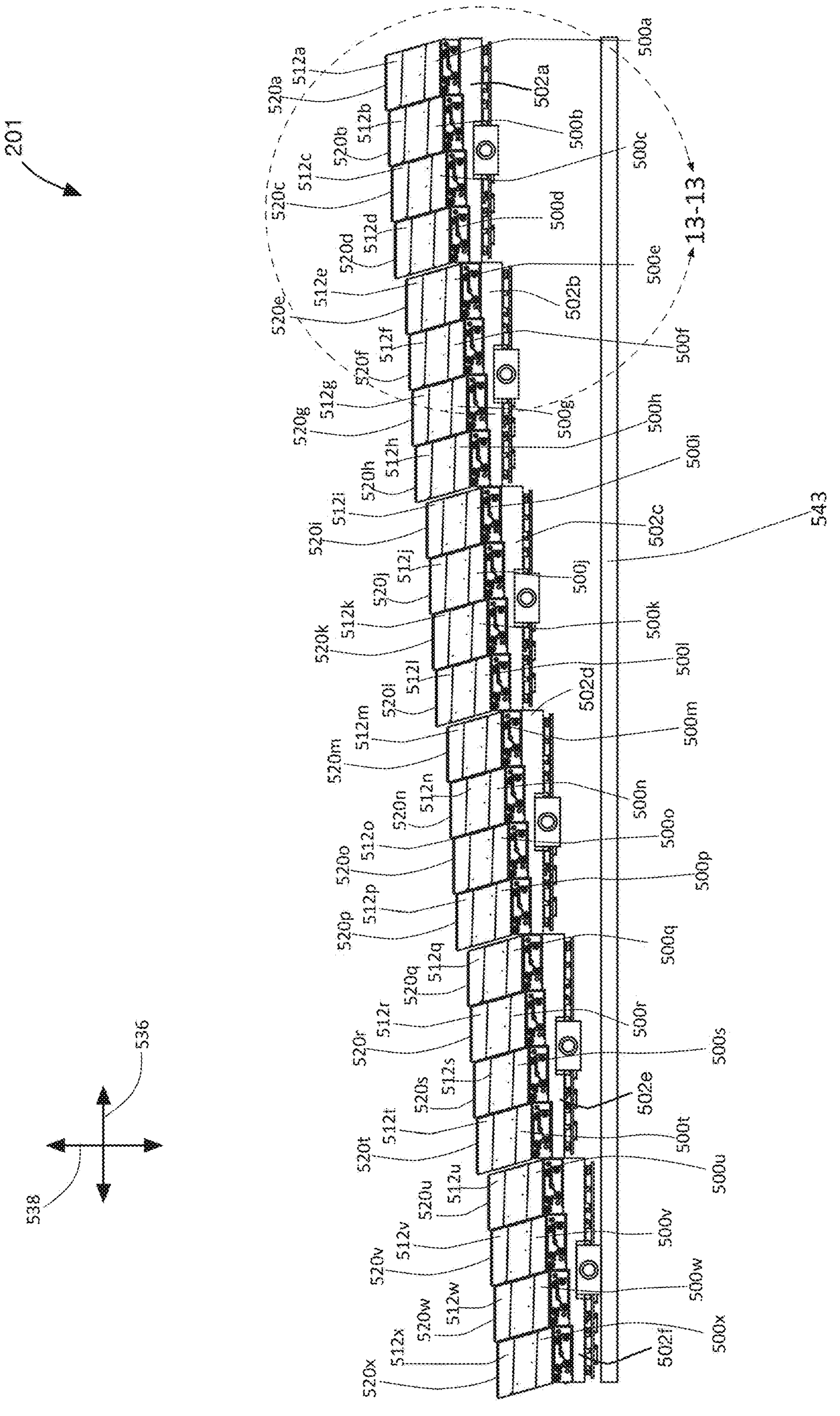
FIG. 12 is a bottom elevational view of the print module of FIG. 1.

FIG. 12 shows one embodiment of the print module 200 that includes a printing unit 201 comprising a plurality of printheads 500 each of which is configured to deposit a particular fluid (e.g., a primer, a particular color of ink, a coating material, and the like) through the plurality of nozzles 526 onto the substrate 22 as the substrate 22 is moved along the process direction 538.

The printheads 500 that comprise the printing unit 201 are secured to one or more printhead holders 502. Specifically, one or more of the printheads 500 that comprise the printing unit 201 are secured to each printhead holder 502. As shown in FIG. 12, for example, printheads 500*a* through 500*d* are secured to printhead holder 502*a*, printheads 500*e* through 500*h* are secured to printhead holder 502*b*, and so on. The printheads 500 that comprise the printing unit 201, and the printhead holders 502 to which such printheads 500 are secured, are disposed such that the plurality of nozzles 526 (see FIG. 11) of the printheads 500 extend along the web width direction 536.

Figure 13:
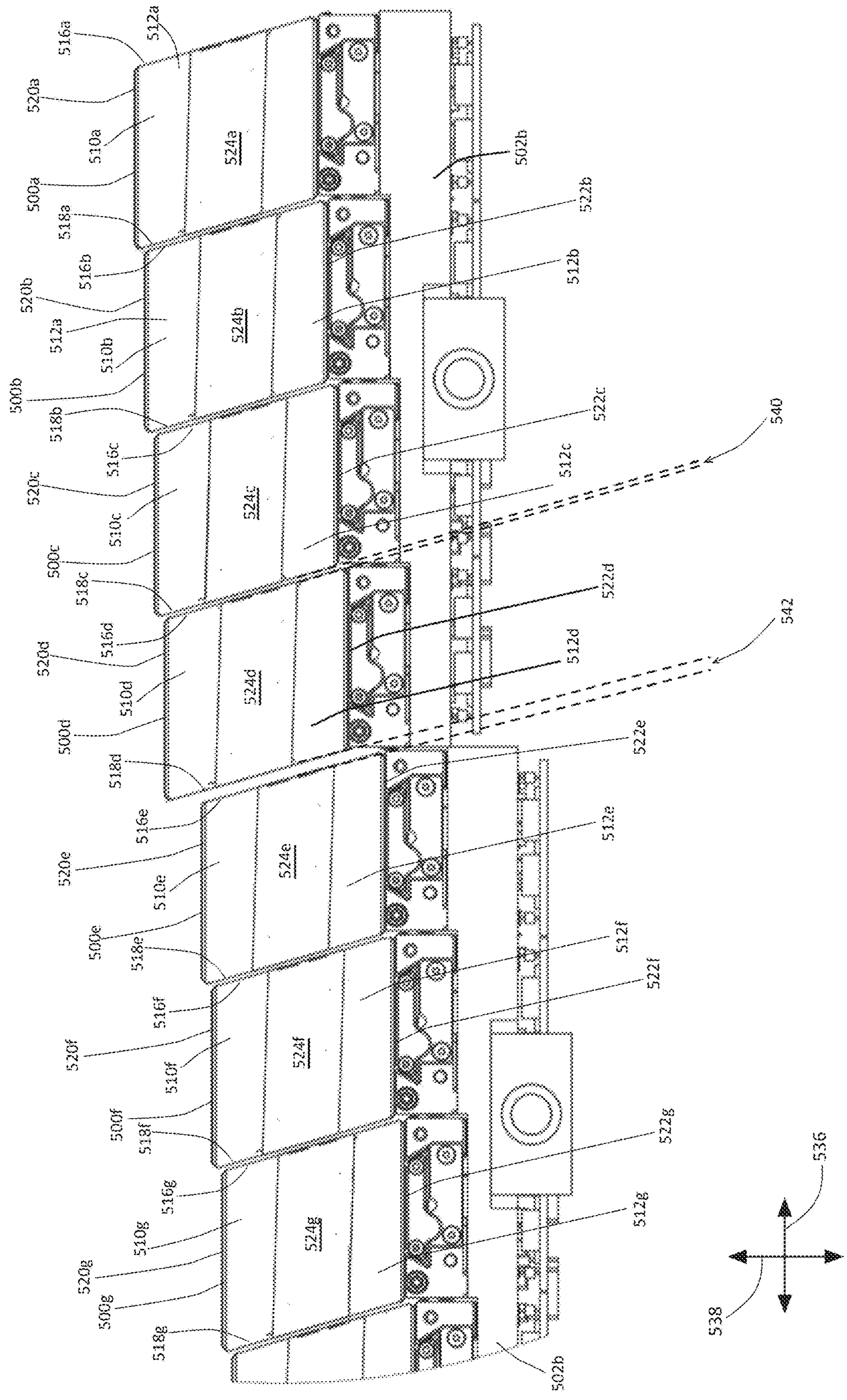
FIG. 13 is a fragmentary, enlarged, bottom elevational view of the print module taken generally along the view lines 13-13 of FIG. 12.

Referring also to FIG. 13, in one embodiment, the printheads 500 are disposed such that the front edges 520 of the printheads disposed in each holder 502 are offset relative to one another in the process direction 538. Thus, as illustrated in FIG. 13, the printheads 500*a* through 500*e* disposed in the printhead holder 502*a* are offset relative to one another, the printheads 500*f* through 500*i* disposed in the printhead holder 502*b* are offset relative to one another, and so on. Because side edges 516, 518 of adjacent printheads 500 disposed in each printhead holder 502 are not parallel to the process direction 538, offsetting the printheads 500 in this manner forms a gap 540 along the width direction 536 between adjacent printheads 500 without affecting the distance along the web width direction 536 between adjacent nozzles of the plurality of nozzles 526 of adjacent printheads 500, respectively. Such gap 540 prevents excess drops of fluid ejected by such printheads 500 from entering and drying between the sidewalls of adjacent printheads 500, prevents debris from becoming lodged between such sidewalls, allows cleaning fluid to enter the gap 540, dislodges and washes away any ink and/or debris in such, and facilitates removal from the holder 502 of one printhead 500 disposed in such holder 502 without knocking or otherwise contacting an adjacent printhead 500 disposed in such holder 502.

In some embodiments, each printhead holder 502 is also offset along the process direction 538 relative to another holder 502 adjacent thereto. As a result, the printhead 500 disposed in one printhead holder 502 (e.g., the printhead 500*d* disposed in the printhead holder 502*a*) and an adjacent printhead 500 disposed in another printhead holder 502 (e.g., the printhead 500*e* disposed in the printhead holder 502*b*) are also offset relative to one another along the process direction 538. Offsetting the printhead holders in this manner forms a gap 542 along the width direction between the first printhead 500*d*, 500*h*, 5001, 500*p*, or 500*t* disposed in the first printhead holder 502*a*, 502*b*, 502*c*, 502*d*, or 502*e*, respectively, and the second printhead 500*e*, 500*f*, 500*i*, 500*q*, or 500*u* disposed in the second printhead holder 502*b*, 502*c*, 502*d*, 502*e*, or 502*f*, respectively, wherein the first printhead and the second printhead are adjacent to one another and disposed in adjacent printhead holders 502. In addition to the reasons for having the gap 540 between adjacent printheads 500 of the same printhead holder 502 described above, having the gap 542 between adjacent printhead holders 502 also facilitates removal of the printhead holder 502 from the print module 200 without risk of a printhead 500 disposed in such printhead holder 502 accidently contacting or knocking against another printhead 500 disposed in an adjacent printhead holder 502.

In some embodiments, the printhead holders 502 are secured to a mounting bar 543 (FIG. 12). Stand-offs and mounts (not shown) are disposed between and secured to the printhead holders 502 and the mounting bar 543.

Figure 14:
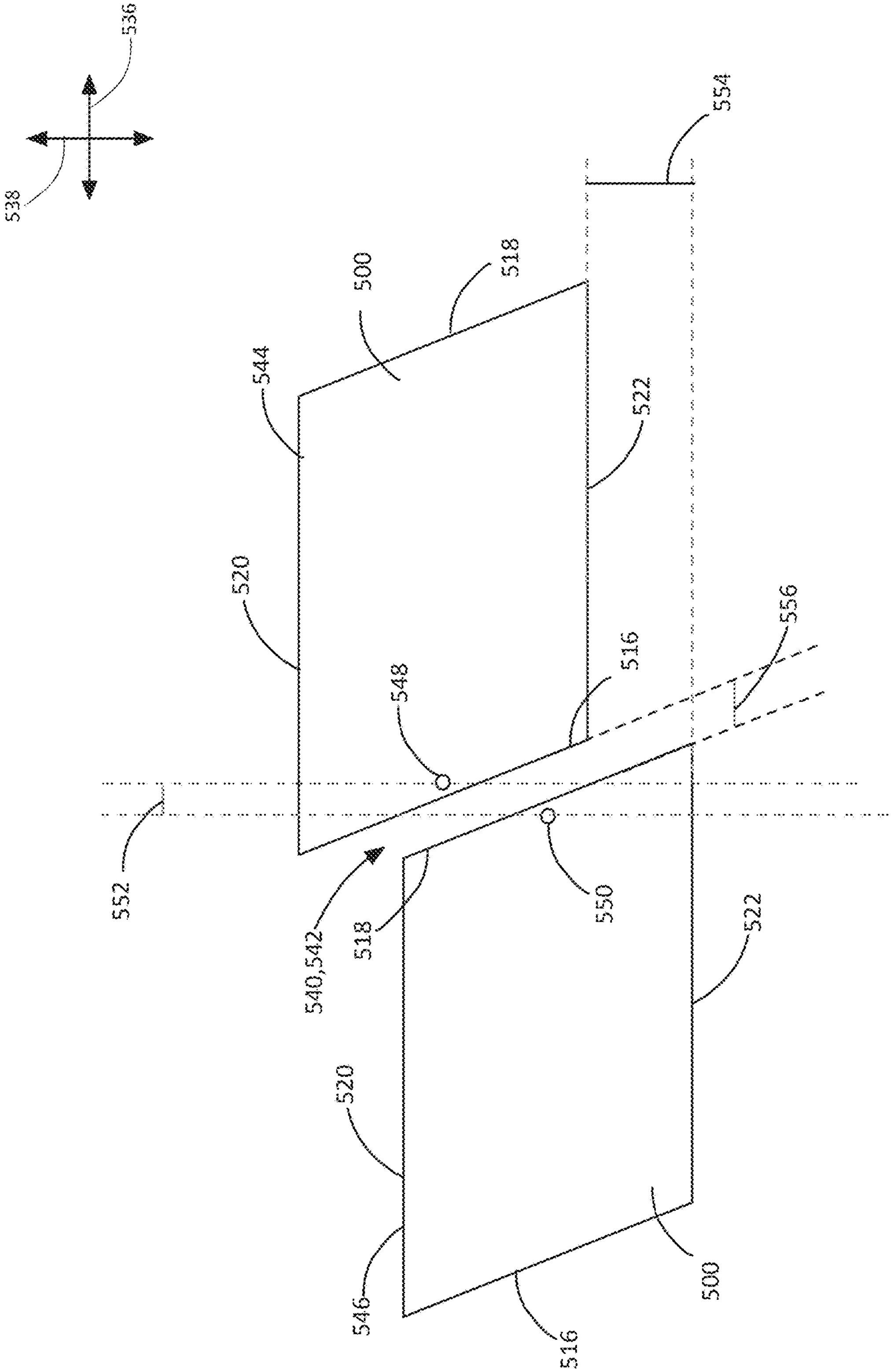
FIG. 14 is a fragmentary, enlarged, bottom elevational and schematic view showing alignment of adjacent printheads of the print module of FIG. 11.

FIG. 14 further illustrates the relationship of first and second adjacent printheads 544, 546 (identical to the printheads 500 described above) and first and second nozzles 548, 550 thereof, respectively, wherein the first and second nozzles 548, 550 are adjacent to one another (i.e., the first and second nozzles 548 and 550 are operable to deposit adjacent drops of fluid onto the substrate 22 along web width direction 536). The first printhead 544 represents any of the printheads 500*a* through 500*w* and the second printhead 546 represents any of the printheads 500*b* through 500*x* adjacent to the printheads 500*a* through 500*w*, respectively, shown in FIG. 12. Note that the arrangement of the first and second printheads 544, 546 and the first and second nozzles 548, 550 are diagrammatically shown for illustrative purposes It should be apparent that because the first nozzle 548 of the first printhead 544 is adjacent to the second nozzle 550 of the second printhead 546, there is no other nozzle of the first printhead 544 between the first nozzle 548 and the first side edge 516 of the first printhead 544. Similarly, there is no other nozzle of the second printhead 546 between the second nozzle 550 and the second side edge 518 of the second printhead 546. Further, to ensure no discontinuities or other unwanted artifacts are apparent between first and second adjacent portions of an image printed by the first and second printheads 544, 546, respectively, a distance 552 along the web width between the first nozzle 548 and the second nozzle 550 should be substantially identical to the nozzle pitch (i.e., distance between nozzles that deposit adjacent drops of another fluid onto the substrate 22) of the plurality of nozzles 526 (see FIG. 11) of the first and second printheads 544, 546. That is, for example, if the first and second printheads 544, 546 are 1200 dot-per-inch printheads, then the nozzle pitch of the plurality of nozzles 526 of such first and second printheads 544, 546 is approximately 0.00083 inch (0.021 mm). In such cases, the distance 552 between the first and second nozzles 548, 550 of the first and second printheads 544, 546 should also be approximately 0.00083 inch (0.021 mm). It should be apparent to one who has ordinary skill in the art that such nozzle pitch varies in accordance with the resolution of the first and second printheads 544, 546 that are being used.

As illustrated in FIG. 14, offsetting the first and second printheads 544, 546 along the process direction 538 by a distance 554 increases the space between the first side edge 516 of the bottom face 512 of the of the first printhead 544 and the second side edge 518 of the bottom face 512 of the second printhead 546. As the offset along the process direction 538 is increased, a distance 556 along the width direction (i.e., the gap 540 or 542 discussed above) increases correspondingly. If the offset along the process direction 538 is sufficient, then the distance 556 exceeds the distance 552 between the first and second adjacent nozzles 548 and 550. That is, the distance 556 exceeds the nozzle pitch of the plurality of 526 of the first and second printheads 544, 546. If the first and second printheads print at different resolutions, the distance 556 along the web width direction 536 exceeds the distance 552 (i.e., nozzle pitch) between the first and second nozzles 548 and 550 along the web width direction 536.

In some embodiments, the adjacent first and second printheads 544, 546 that are in the same printhead holder 502 are offset along the process direction 538 so that the distance 554 between a rear edge 522 of the bottom face 512 of the first printhead 544 and the rear edge 522 of bottom face 512 the second printhead 546 is between approximately 0.0846 inches and 0.1034 inches, and in an embodiment, approximately 0.094 inches (2.38 mm). Further, the adjacent first and second printheads 544, 546 that are in adjacent printhead holders 502 are offset along the process direction 538 so that the distance 554 between the rear edge 522 of the bottom face 512 of the first printhead 544 of one holder 502 and the rear edge 522 of bottom face 512 of the second printhead 546 in an adjacent holder 502 preferably is between approximately 0.3096 inches and approximately 0.3784 inches, and, in an embodiment, preferably approximately 0.344 inches (8.74 mm).

In some embodiments, the gap 540 between adjacent printheads 500 in the same holder 502 results in a spacing between adjacent sidewalls 516,518 of the printheads 500 when measured along a direction perpendicular to such sidewalls of between approximately 0.0342 inches and approximately 0.0418, and, in an embodiment, approximately 0.038 inches.

In some embodiments, the gap 542 between adjacent printheads 500 of adjacent holders 502 results in a spacing between adjacent sidewalls 516,518 of the adjacent printheads 500 disposed in adjacent holders 502 when measured along a direction perpendicular to such sidewalls between approximately 0.0954 inches and approximately 0.1166, and, in an embodiment, preferably approximately 0.106 inches.

It should be apparent to one who has ordinary skill in the art that increasing or reducing the distance 554 between the rear edges 522 of the first and second printheads 544,546 increases or reduces the distance 556 between adjacent sidewalls 516,518 of the first and second printheads 544, 546, respectively. For example, in some embodiments, the distance 554 between the rear edge 522 of the bottom face 512 of the first printhead 544 and the rear edge 522 of bottom face 512 the second printhead 546 is preferably between approximately 0.0594 inches and 0.0726 inches, and in one such embodiment approximately 0.066 inches. In such embodiments, the gap 540,542 between the first and second printheads 544,546 is such that the distance 556 between adjacent sidewalls 516,518 of the first and second printheads 544,546, respectively, along the web width direction is between approximately 0.0297 inches and 0.0363 inches and in one such embodiment is approximately 0.033 inches.

In some embodiments, the printhead 500 disposed in the printing unit 201 is a model Samba G3L and/or Samba G5L printhead sold by Fujifilm Dimatix, Inc., of Santa Clara, California. It should be apparent to one who has ordinary skill in the art that a different printhead that still has a first side edge 516 and a second side edge 518 that are not parallel to the process direction 538 may be used in the printing unit 201. Further, the printing unit 201 may configured to use other printheads wherein such other printheads that are adjacent to one another have bottom faces that overlap in the process direction while print produced by the adjacent printheads is stitched.

Figure 15:
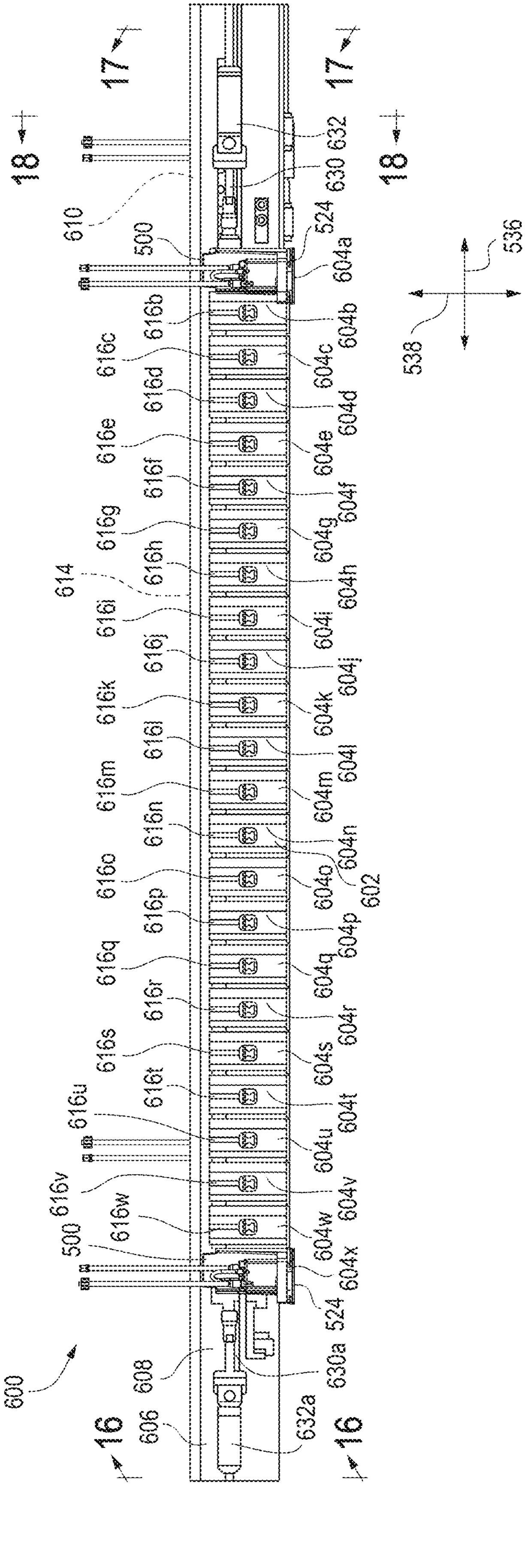
FIG. 15 is a side elevational view of another embodiment of the print module of FIG. 10.

FIGS. 15 through 19 show another embodiment 600 of the print module 200. Referring to FIGS. 15-19, the print module 600 comprises a first printing unit 602 having a first plurality of printhead holders 604*a* through 604*x* that are slidably mounted along a first side 606 of a central block 608. A printhead 500 may be secured to a corresponding one of the first plurality of printhead holders 604. For clarity, FIG. 15 shows printheads 500 disposed in printhead holders 604*a* and 604*x* only and printhead holders 604*b* through 604*w* are shown free of printheads 500.

The printhead holders 604*a* through 202*x* and the printheads 500 secured thereto are disposed such that the plurality of nozzles 526 (see FIG. 11) of the printheads 500 extends along the web width direction 536. Thus, each of the printheads 500 that are secured in the printhead holders 604 is operable to deposit a first particular fluid (e.g., a primer, a particular color of ink, a coating material, and the like) through the plurality of nozzles 526 thereof onto the substrate 22 as such substrate is moved along the process direction 538.

In some embodiments, the print module 600 comprises a second printing unit 610 comprising a second plurality of printhead holders 612 that are slidably mounted on a second side 614 of the central block 608, and a printhead 500 may be secured to each one of the second plurality of printhead holders 612. In such embodiments, the printhead holders 612 are disposed such that the plurality of nozzles 526 of the printheads 500 disposed in the printhead holders 612 extend along the web width direction 536. Each of the printheads 500 disposed in the printhead holders 612 is operable to deposit a second fluid through the printhead nozzles 526 thereof onto the substrate 22 as the substrate is moved continuously along the process direction 538. Although the first and second fluids are typically different, it should be apparent to one of ordinary skill in the art that the printheads 500 disposed in the first plurality of printhead holders 604 and the printheads disposed in the second plurality of printhead holders 612 may be operable to deposit the same fluid (e.g., for overprinting or other applications apparent to one who has ordinary skill in the art). It should be apparent the print module 200 may be configured with as many printhead holders 612 (and thus printheads 500) as necessary so that the nozzles 526 of the printheads 500 disposed in such printhead holders 612 span substrate 22 along the width direction 536 to print an image having a desired width.

Each printhead holder 612 comprises a front plate 616 and a rear plate 618 secured to one another. The front plate 616 includes a mounting apparatus 620 to which a printhead 500 may be secured.

A first linear bearing block 622 (See FIG. 18) is secured to the rear plate 618 of each printhead holder 612. The first linear bearing block 622 of each printhead holder 612 is slidably disposed on a first linear bearing rail 624 that is secured to the central block 608. In some embodiments, a second linear bearing block 626 is secured to the rear plate 618 of each printhead holder 612 and the second linear bearing block 626 is slidably disposed on a second linear bearing rail 628, also secured to the central block 608.

Similarly, each of the second plurality of printhead holders 604 is disposed on the central block 608 by the corresponding first linear bearing block 218*a* disposed on the first linear bearing rail 624 and (optionally) the second linear bearing block 626 disposed on the second linear bearing rail 628.

In some embodiments, one or more spacing and alignment members 629 may be disposed between the front and rear plates 616, 618 to adjust the distance between the front plate 616 and the first side 606 of the central block 608 along the process direction 538 and/or the angle between the front plate 616 and the first side 606 of the central block 608. It should be apparent to one of ordinary skill in the art that adjusting the distance and/or angle between the front plate 616 of a printhead holder 604 and first side 606 of the central block 608 also adjusts the distance and/or angle between the front plate 616 and first side 606 and between the printhead 500 disposed in such printhead holder 604 and the first side 606. The distance and/or angle between the each of the second plurality of printhead holders 612 and the second side 614 of the central block 608 may be adjusted in a similar fashion.

As shown in FIG. 15, the first printing unit 602 includes the printhead holders 604*a* through 604*x* secured to the first side 606 of the central block 608 and distributed along the web width direction 536. In this embodiment, the printhead holders 604*a* and 604*x* are terminal printhead holders and the printhead holders 604*b* through 604*w* comprise intermediate printhead holders disposed therebetween.

Figure 16:
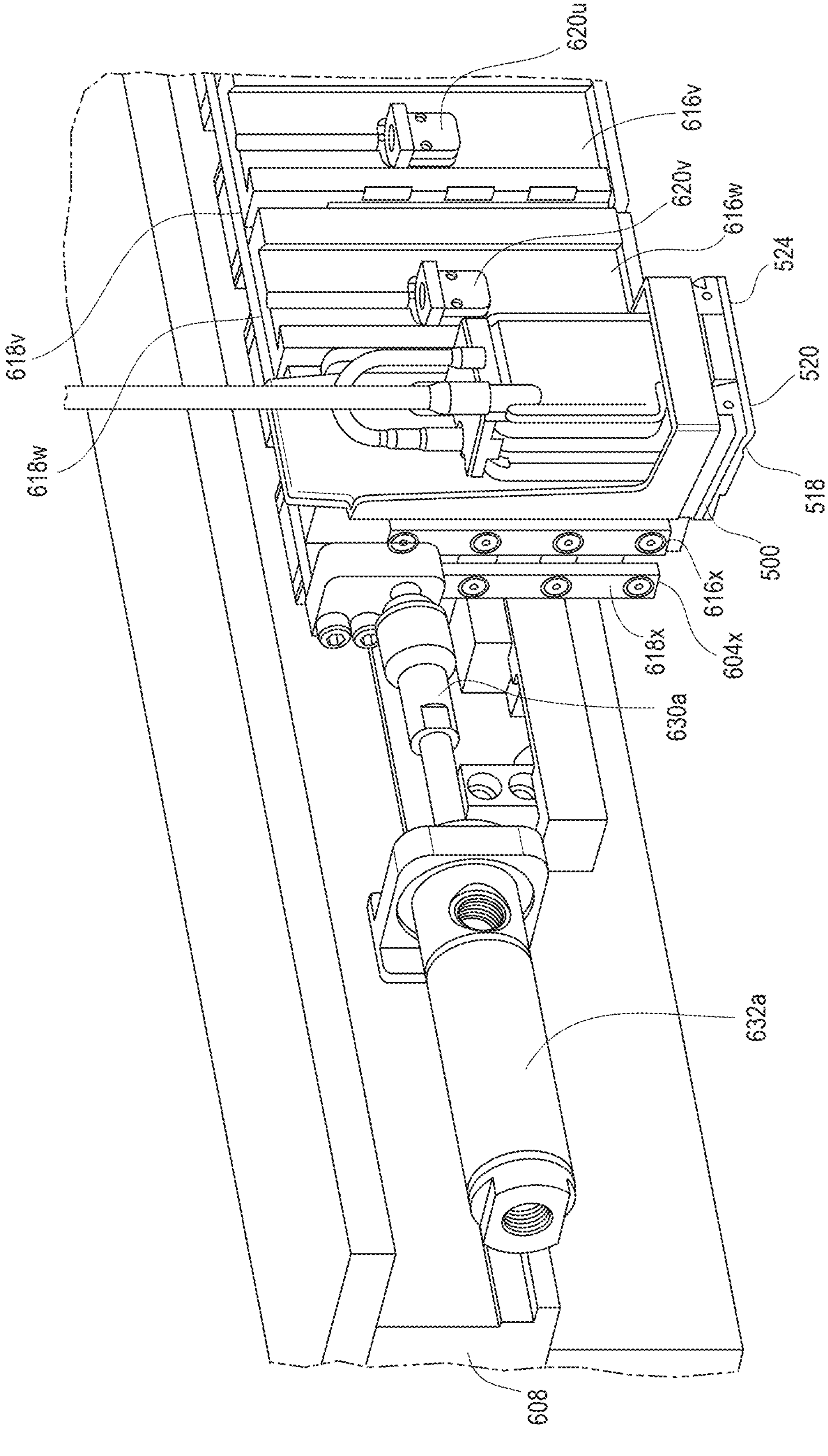
FIG. 16 is an isometric view of the print module taken generally along the view lines 16-16 of FIG. 15.
Figure 17:
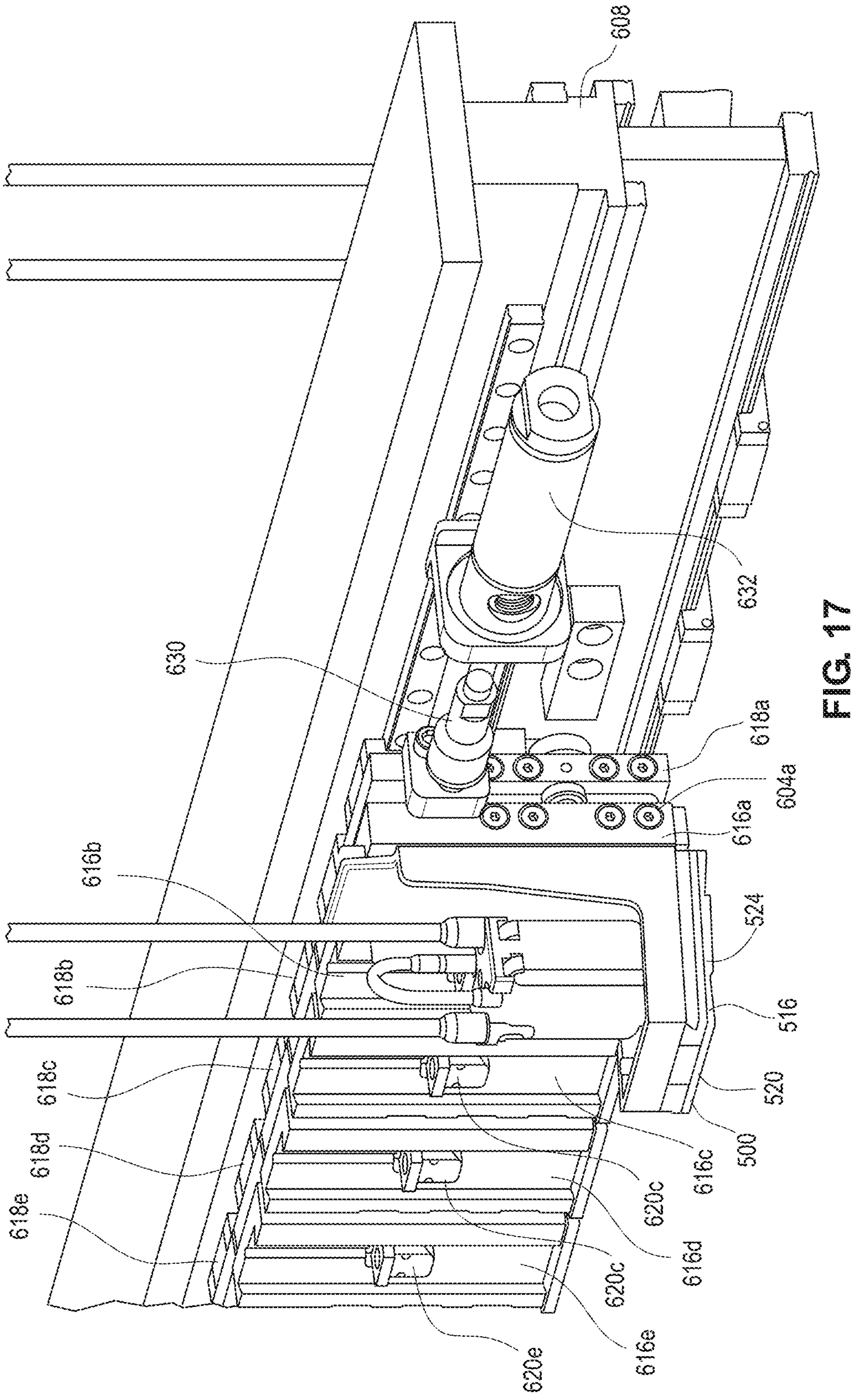
FIG. 17 is an isometric view of the print module taken generally along the view lines 17-17 of FIG. 15.

In some embodiments, an extensible arm 630 of a linear actuator 632 is secured to the terminal printhead holder 604*a*. In some embodiments, the terminal printhead holder 604*x* is secured to an extensible arm 630 of another linear actuator 632*a*, as shown in FIGS. 15 and 16.

Figure 19A:
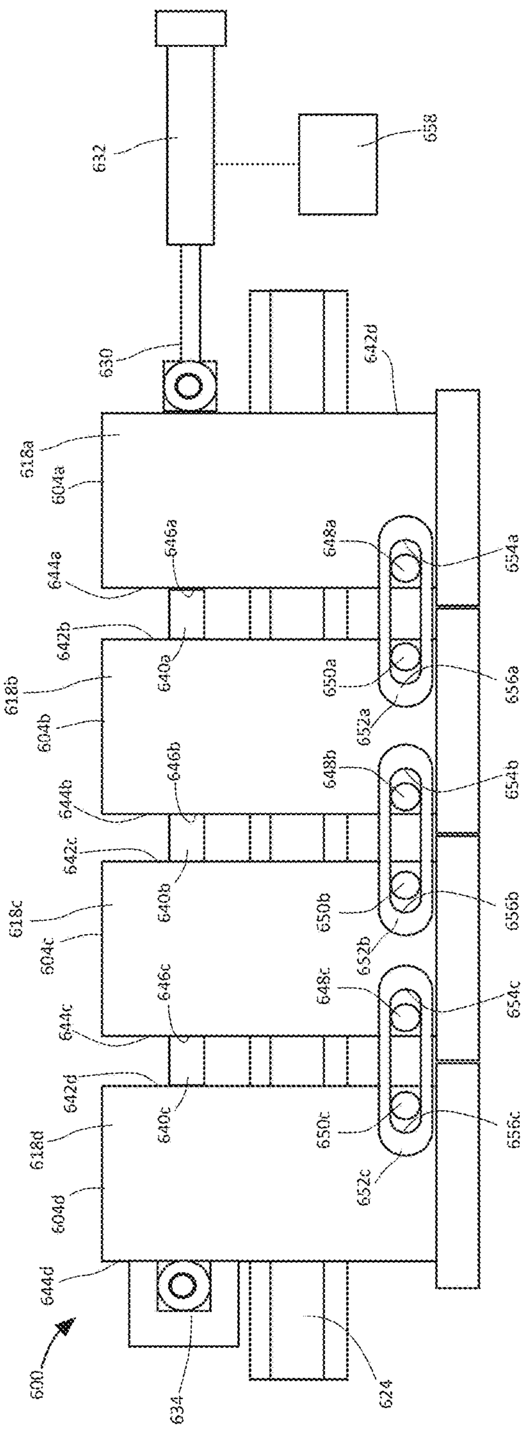
FIG. 19A is a side elevational schematic view of the print module of FIG. 15 in an operational position, shown with fewer printheads and some elements omitted for clarity.
Figure 19B:
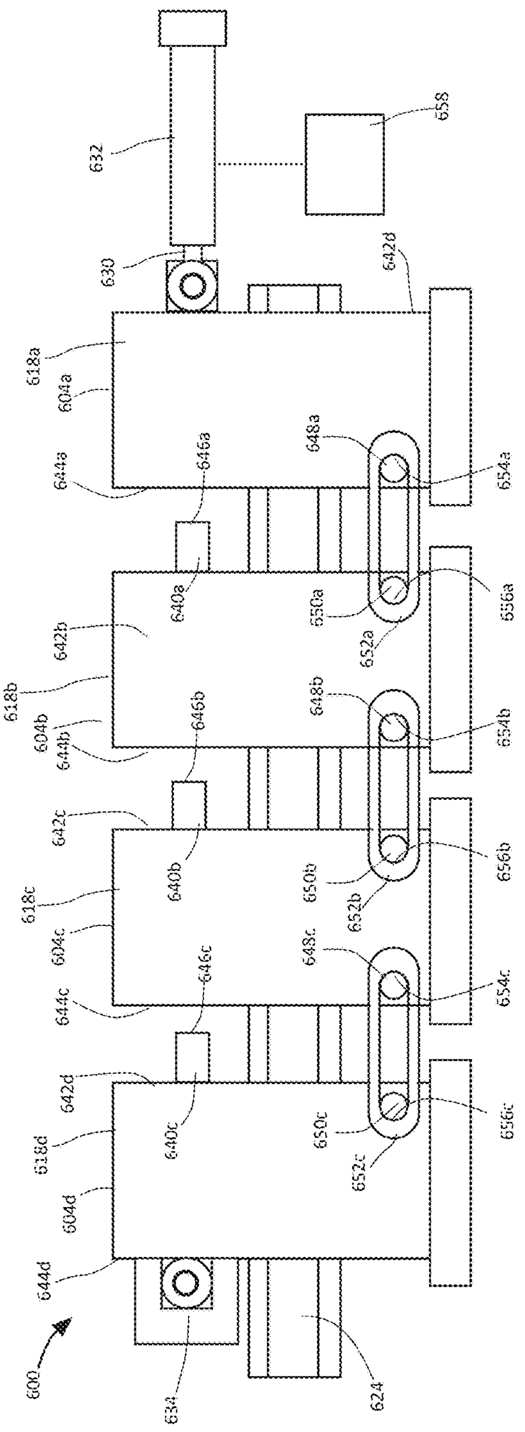
FIG. 19B is a side elevational schematic view of the print module of FIG. 15 in a maintenance position, shown with fewer printheads and certain elements omitted for clarity.

In other embodiments, the terminal printhead holder 604*x* is secured to a stationary block 634 secured to the first side 606 of the central block 608 (as shown in FIGS. 19A and 19B). The stationary block 634 provides an anchor that prevents movement of the terminal printhead holder 604*x* along the first bearing rail 624.

Similarly, one of the terminal printhead holders 612 secured to the second side 614 of the central block 608 is secured an extensible arm 636 of another linear actuator 636 and another one of the terminal printhead holders 612 secured to the second side 614 of the central block 608 is secured to another stationary block (not shown).

As described in greater detail below, the printhead holders 604 of the print module 200 are movable between an operational position (i.e., printing position) and a maintenance position. When in the operational position, the printhead holders 604 are arranged so there is a predetermined gap between adjacent bottom faces 512 of printheads 500 disposed in the printhead holders 604 that are adjacent to one another along the web width direction 536. Such gap depends on the resolution of the adjacent first and second printheads 500 disposed in the printhead holders 604. In particular, the predetermined gap is selected such that a distance between a first nozzle of the plurality of nozzles 526 of the first printhead 500 disposed in a first printhead holder 604 that is adjacent a second nozzle of the plurality of nozzles 526 of the second printhead 500 disposed in an adjacent second printhead holder 604, respectively, is in accordance with the nozzle pitch of the plurality of nozzles of the first and second printheads 500. In some embodiments, the predetermined gap between the sidewalls 516,518 of adjacent printheads is between approximately 0.0117 inches and 0.0143 inches, and preferably approximately 0.013 inches.

When the first printhead holders 604 are moved from the operational position to the maintenance position, each one of the printhead holders 604 is moved a predetermined amount along the first and second linear bearing rails 624, 628 in a direction parallel to the web width direction 536 such that such printhead holder 604 (and the printhead 500 disposed therein) is spaced apart sufficiently from an adjacent printhead holder 604 (and the printhead 500 disposed therein). Such spacing facilitates cleaning between the printheads 500 to remove ink and or debris trapped between adjacent printheads 500 or printhead holders 604 and removal of the printhead 500 disposed in the printhead holder 604 without contacting an adjacent printhead holder 604. In some embodiments, such predetermined gap between the sidewalls 516,518 of adjacent printheads, when in the maintenance position, is between approximately 0.054 inches and 0.066 inches, and preferably approximately 0.066 inches.

FIGS. 19A and 19B are simplified schematic drawings of the printing unit 602 that illustrate movement the printhead holders 604 between the operational position and the maintenance position. For purposes of clarity, FIGS. 19A and 19B show the printing unit 602 having only four printhead holders 604*a* through 604*d* and certain components of the printing unit 201 of the print module 200 discussed above are not shown FIGS. 19A and 19B. The movement between the operational position and the maintenance position with respect to the four printhead holders 604*a* through 604*d* is equally applicable to a print module 200 having more than four holders and to print holders 612 (not shown in FIGS. 19A and 19B) of the print module 200.

Referring to FIGS. 19A and 19B, the printhead holders 604*a* and 604*d* comprise first and second terminal printhead holders and the printhead holders 604*b* and 604*c* comprise intermediary printhead holders disposed between such terminal printhead holders. As described above, the first terminal printhead holder 604*a* is secured to an extensible arm 630 of the linear actuator 632. The second terminal printhead holder is secured to the stationary block or anchor 634 or an extensible arm 630*a* of another linear actuator 632*a*.

Position projections or slide limiters 640*a* through 640*c* extend from the second terminal printhead holder 604*d* and the intermediate printhead holders 604*b*, 604*c*, respectively. Each projection 640*a* through 640*c* extends from first sidewalls 642*b* through 642*d* of the rear plates 618*b* and 618*d* of the printhead holders 604*b* through 604*d*, respectively. Further, each projection 640*a* through 640*c* extends toward a second sidewall 644*a* through 644*c* of the adjacent printhead holders 604*a* through 604*c*, respectively. As described in detail below, the lengths of projections 640 that extend into the space between printhead holders 604 determines the spacing between printheads 500 when the printhead holders 604 are in the operational position. In one embodiment, the projections 640 are micrometer screws screwed into the sidewalls 642, a wedge disposed on the sidewalls 642, or other types of spacers disposed on the sidewalls 642 apparent to one who has ordinary skill in the art. It should be apparent to one of ordinary skill in the art that other types of projections may be used.

When the plurality of printhead holders 604 is in the operational (i.e., printing) position (shown in FIG. 19A), the extensible arm 630 of the linear actuator 632 (and, if used, the extensible arm 630*a* of the linear actuator 632*a*) is in an extended position. In addition, adjacent printhead holders 604 are positioned such that a sidewall 646 of each projection 640 that extends from the first sidewall 642 of the rear plate 618 of each first printhead holder 604 abuts the second sidewall 644 of a second printhead holder 604 adjacent to the first printhead holder 604. As a result, a space between the sidewalls 642, 644 between adjacent holders is substantially identical to the length of the projection 640 that extends into such space from the first sidewall 642.

In addition, first posts 648*a* through 648*c* are disposed proximate the second sidewalls 644*a* through 644*c* of the rear plates 618*a* through 618*c* of the printhead holders 202*a* through 604*c*, respectively. Second posts 650*a* through 650*c* are disposed proximate the first sidewalls 642*b* through 642*d* of the rear plates 618*b* through 618*d* of the printhead holders

202*b* through 604*c*, respectively. Thus, the first terminal printhead holder 604*a* has a first post 648*a*, the second terminal printhead holder 604*d* has a second post 650*c*, and each intermediate printhead holder 604*b*, 604*c* has both a first post 648 and a second post 650. Each first post 648 disposed on the first printhead holder 604 and the second post 650 disposed on the second printhead holder 604 adjacent thereto are substantially collinear with respect to one another. Further, a link or a loop 652 couples the first post 648 on the first printhead holder 604 and the second post 650 on the second printhead holder 604 adjacent thereto.

When the printhead holders 604 are in the maintenance position (shown in FIG. 19B), the extensible arm 630 of the linear actuator 632 (and the extensible is in a retracted position and adjacent printhead holders 604 are positioned such that first and second distal interior ends 654, 656 of each link 652 contact the first and second posts 648, 650 of adjacent printhead holders 604 surrounded by such link 652. Thus, a space between sidewalls 642, 644 of the rear plates 618 of adjacent printhead holders 604 is substantially identical to a length of the opening of the links 652 (i.e., the distance between the first and second distal interior ends 654, 656 of such links 652).

As described above, the global controller 110 operates the printhead transport apparatus 114, in response to operator commands, to move the printhead holders 604 from the operational position to the maintenance position and from the maintenance position to the operational position. In one embodiment, the printhead transport apparatus 114 comprises a printhead transport controller 658 that receives operator commands received by the global controller 110, and in response operates the linear actuator 632 (and the linear 632*a*, if appropriate) as described below.

Figure 20:
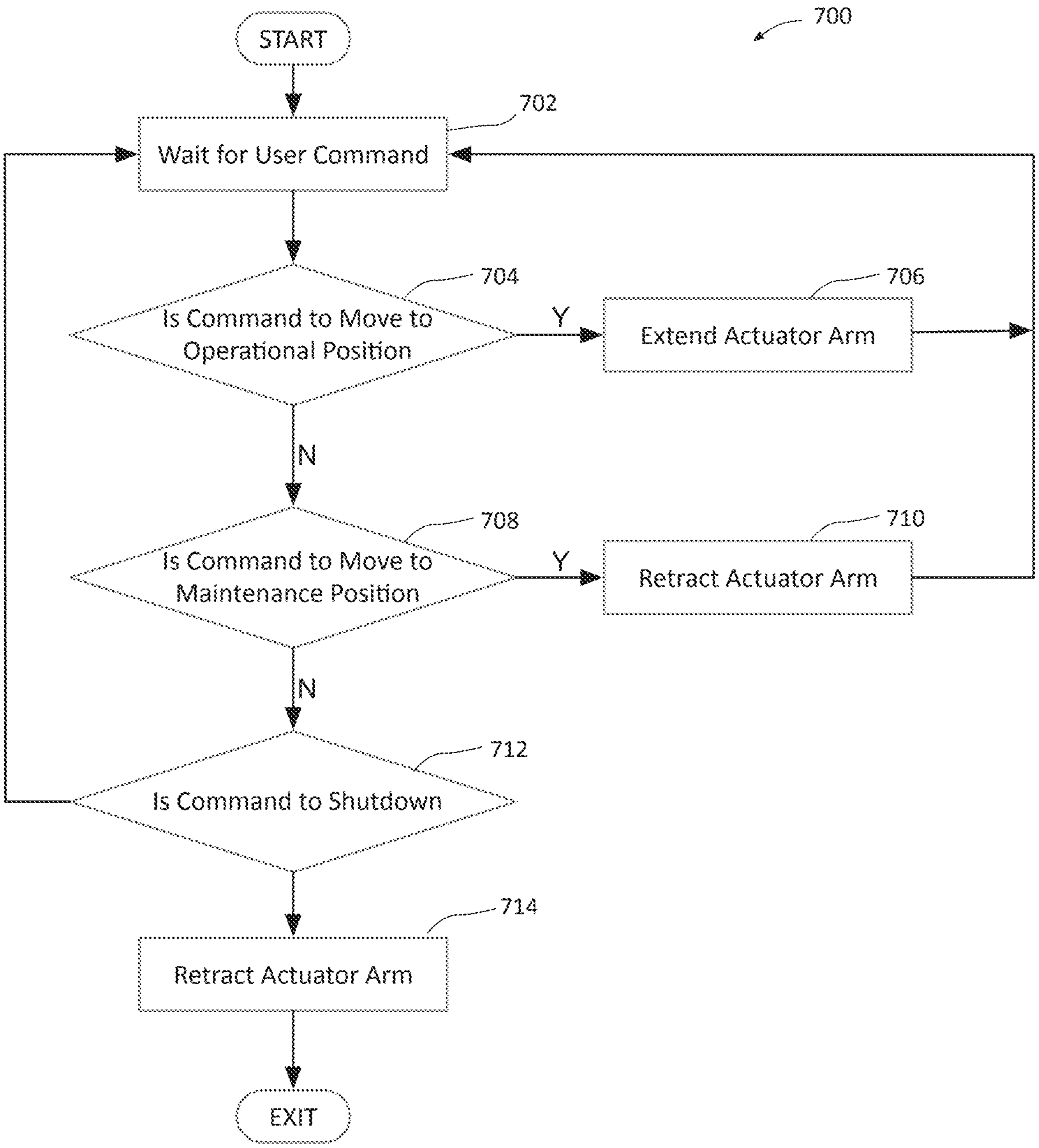
FIG. 20 is a flowchart showing the steps undertaken by a printhead transport controller to move the print module of FIG. 15 between the operational position and the maintenance position shown in FIGS. 19A and 19B, respectively.

FIG. 20 is a flow chart 700 that shows the processing undertaken by the printhead transport controller 658 (FIGS. 19A,19B) of the global controller 110. Referring also to FIG. 9, at a block 702, the printhead transport controller 658 waits until a command is received from the operator via the global controller 110. At a block 704, the printhead transport controller 658 determines if the command is a directive to move the printhead holders 604 into the operational position and, if so, the printhead transport controller 658 proceeds to a block 706, otherwise the printhead transport 658 controller proceeds to a block 708.

At the block 706, the printhead transport controller 658 actuates the linear actuator 632 to extend the arm 630. In those embodiments in which the terminal printhead 604*x* is coupled to the extendable arm 630*a* of the linear actuator 632*a*, the printhead transport controller 658 also actuates the linear actuator 632*a*. Doing so forces the first printhead holder 604*a* (and 604*a*) coupled to the arm 630 (and arm 630*a*) and the intermediate printhead holders 604*b*, 604*c* closer together. The printhead transport controller 658 actuates the linear actuator 632 (and linear actuator 632*a*) to extend the arm 630 (and the arm 630*a*) a predetermined distance necessary for all of the sidewalls 646 of the projections 640 disposed on the first sidewalls 642 of the rear plate 618*d* of the second terminal printhead holder 604*d* and the intermediate printhead holders 604*b*, 604*c* to contact and abut the first sidewalls 642 of the intermediate printhead holders 604*b*, 604*c* and the first terminal printhead holder 604*a*, respectively.

After the block 706, the printhead transport controller 658 proceeds to the block 702 to await another command.

At the block 708, the printhead transport controller 658 determines if the command received at the block 702 is a directive to move to the maintenance position. If so, the printhead transport controller 658 proceeds to a block 710, otherwise the printhead transport controller 658 proceeds to a block 712.

At the block 710, the printhead transport controller 658 operates the linear actuator 632 to retract the arm 630. In those embodiments in which the terminal printhead holder 604*x* is coupled to the arm 630*a* of the linear actuator 632*a*, the printhead transport controller 658 also operates the linear actuator 632*a* to retract the arm 630*a*. Doing so pulls first terminal printhead holder 604*a* and the intermediate printhead holders 604*b*, 604*c* toward the linear actuator 632 (the linear actuator 632*a*, if appropriate). The printhead transport controller 658 operates the linear actuator 632 (and 632*a*) to cause the arm 630 (and 630*a*) to retract a predetermined amount necessary for the first and second distal interior ends 654, 656 of all the links 652 to contact the first and second posts 648, 650 surrounded by such links. In those embodiments in which the second terminal printhead holder 604*d* is anchored to the block 634 and cannot move, the amount of movement of the first terminal printhead holder 604*d* and the intermediate printhead holders is limited by the distance between the first and second distal interior ends 654, 656 of the links 652. Similarly, in those embodiments in which the second terminal printhead holder 604*x* is coupled to the linear actuator 632*a*, movement of the first and second terminal holders 604*a* and 604*x*, and the intermediate printhead holders therebetween is limited by the first and second distal interior ends 654,656 of the links 652. Thereafter, the printhead transport controller 658 proceeds to the block 702 to await another command.

At the block 712, the printhead transport controller 658 determines if the command received at the block 702 is a directive to begin shutdown of the print module 200. If so, at a block 714, the printhead transport controller 658 operates the linear actuator 632 to move the print module 200 to the maintenance position (or another predetermined position between the operational and maintenance positions) and exits. Otherwise, the printhead transport controller 658 returns to the block 702 to await another command.

In some embodiments, the printhead transport controller 658, at the blocks 706 and 710, checks whether the arm 630 (and arm 630*a*) is (are) already in the extended or retracted state, respectively, and if so, does not further extend or retract the arm(s). Similarly, at the block 714, the printhead transport controller 658 checks the position of the arm 630 (and arm 630*a*) to determine whether to retract, extend, or maintain the position thereof to move the printing unit 600 into the maintenance or other predetermined other position.

Although the foregoing describes moving the printhead holders 604 of the printing unit 602 between the operational and maintenance positions, it should be apparent to one who has ordinary skill in the art that the printhead holder 612 of the printing unit 602 may be moved between the operational and maintenance positions in a substantially identical manner. Further, although FIGS. 19A and 19B show two intermediate printhead holder 604 between two terminal printhead holders 604, it should be apparent to one of ordinary skill in the art that the printing unit 602 may comprise more or fewer intermediate printhead holders 604 disposed between two terminal printhead holder 604 and that such terminal and more or fewer printhead holders may be moved between the operational and maintenance positions as described above.

Figure 21:
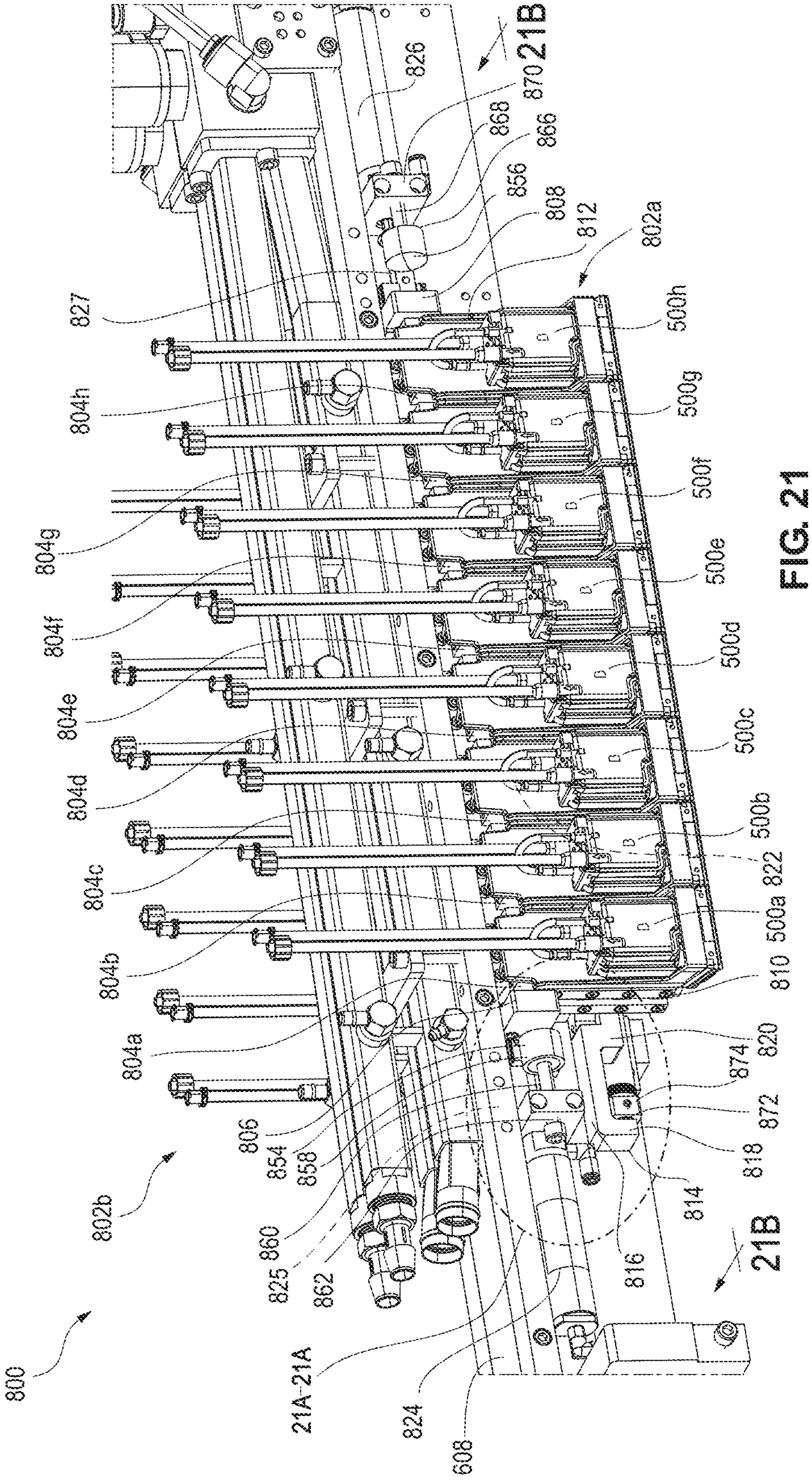
FIG. 21 is an isometric top view of another embodiment of the print module of FIG. 1, shown with certain elements omitted for clarity.
Figure 21A:
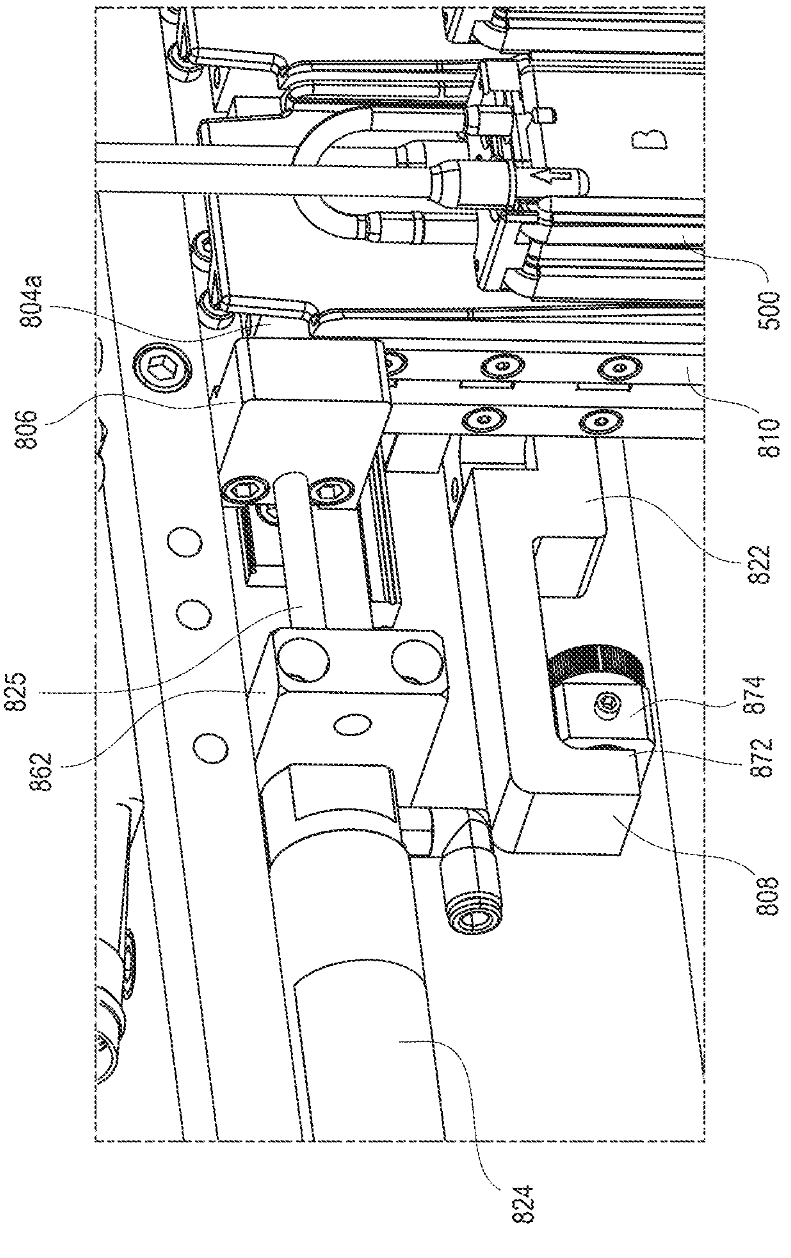
FIG. 21A is a detailed view of the portion 21A-21A of FIG. 21 with the linear actuators of the print module in an extended position.
Figure 22:
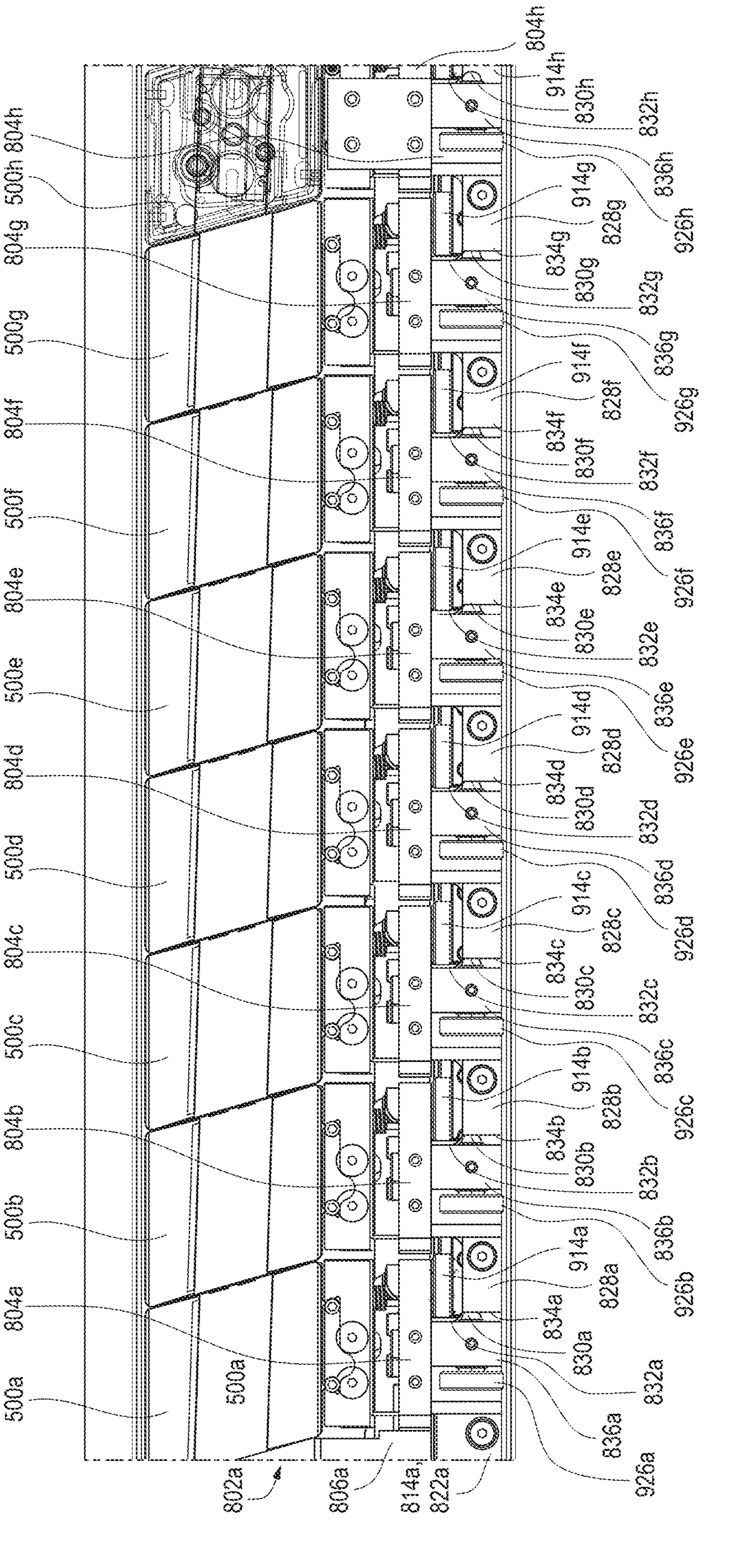
FIG. 22 is a bottom elevational view of the print module of FIG. 21.
Figure 23:
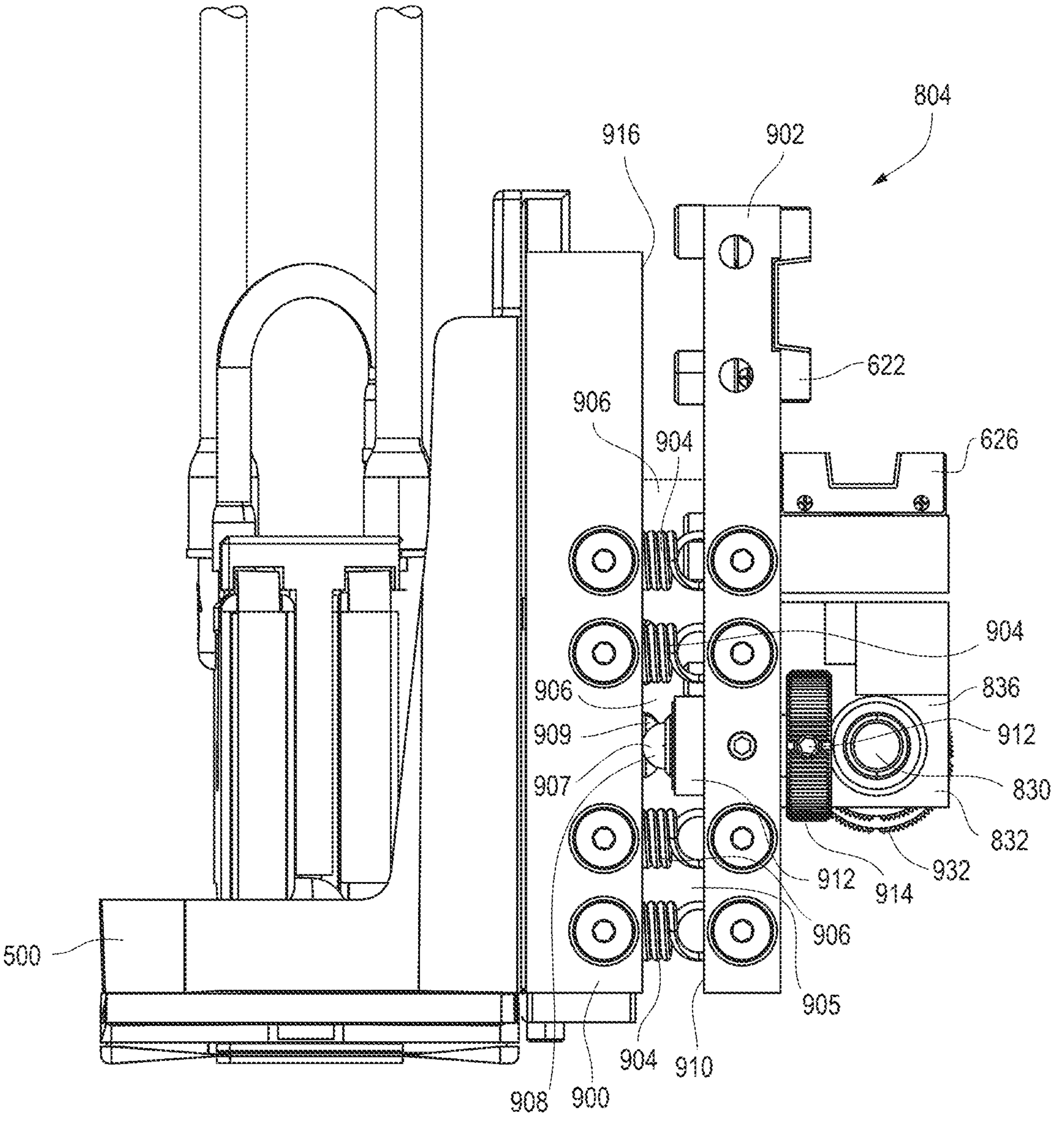
FIG. 23 is a side elevational view of a printhead holder with a printhead disposed therein that may be used in the print module of FIG. 21.
Figure 24:
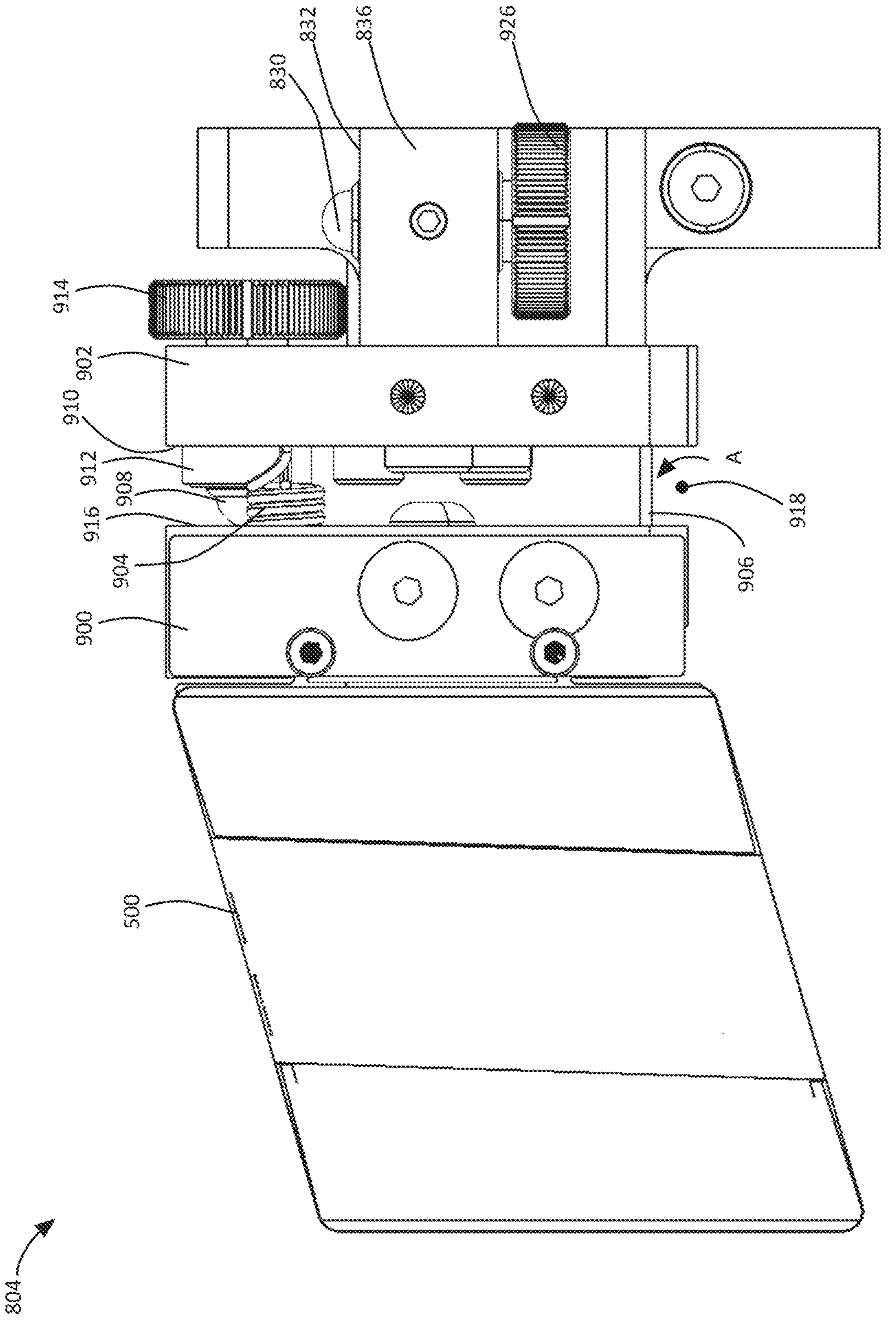
FIG. 24 is a bottom elevational view of a portion of the printhead holder and printhead of FIG. 23.

FIGS. 21 and 22 show another embodiment 800 of the print module 200 that is functionally similar to embodiment 600 described above. Like the embodiment 600, the embodiment 800 includes substantially identical first and second print units 802*a*, 802*b*, disposed on opposite sides of the central bar 608. Each print unit 802 includes terminal printhead holders 804*a* and 804*h*, intermediate printhead holders 804*b* through 804*g* disposed between the terminal printhead holders 804*a*,804*h*, and a printhead 500 disposed in each printhead holder 804.

First and second transport blocks 806,808 are fastened to sidewalls 810,812 of the terminal printhead holders 804*a*, 804*h*, respectively. A stop block 814 is also fastened to the sidewall 810. In particular, the stop block 814 has a base portion 816, first and second side portions 818,820 extending downward from the base portion 816. The base portion 816 and the side portions 818,820 combine to form an inverted u-shape. In addition, an extension portion 822 extends from the second side portion 820 and is fastened to the sidewall 810. In some embodiments, the extension portion 822 is substantially parallel to the base portion 816.

The print unit 802 further includes first and second linear actuators (such as low friction air cylinders) 824,826 having extension arms 825,827, respectively, coupled to the first and second transport blocks 806,808, respectively. In some embodiments, the extension arms 825,827 comprise a threaded portion that threads into a corresponding threaded portion of the transport blocks 806,808, respectively.

Referring also to FIG. 22, each intermediate printhead holder 804*b*-804*g* includes a first spacer block 828*a*-828*f*, respectively. In addition, the terminal printhead holder 804*h* that is distal from the stop block 814 and to which the second transport block 808 is secured also includes a first spacer block 828*g*. The terminal printhead holder 804*a* does not include a first spacer block 828. Instead, the extension portion 822 of the stop block 814 is disposed in the space that would otherwise be occupied by a first spacer block 828 and the extension portion 822 is secured to the terminal printhead holder 804*a*.

Similar to the printhead holders 604 and projections 640 described above (see FIGS. 15-19B), each printhead holder 804 includes a projection 830 that is secured to and extends outwardly from a sidewall 832 of a second spacer block 836 secured to the printhead holder 804.

Figure 21B:
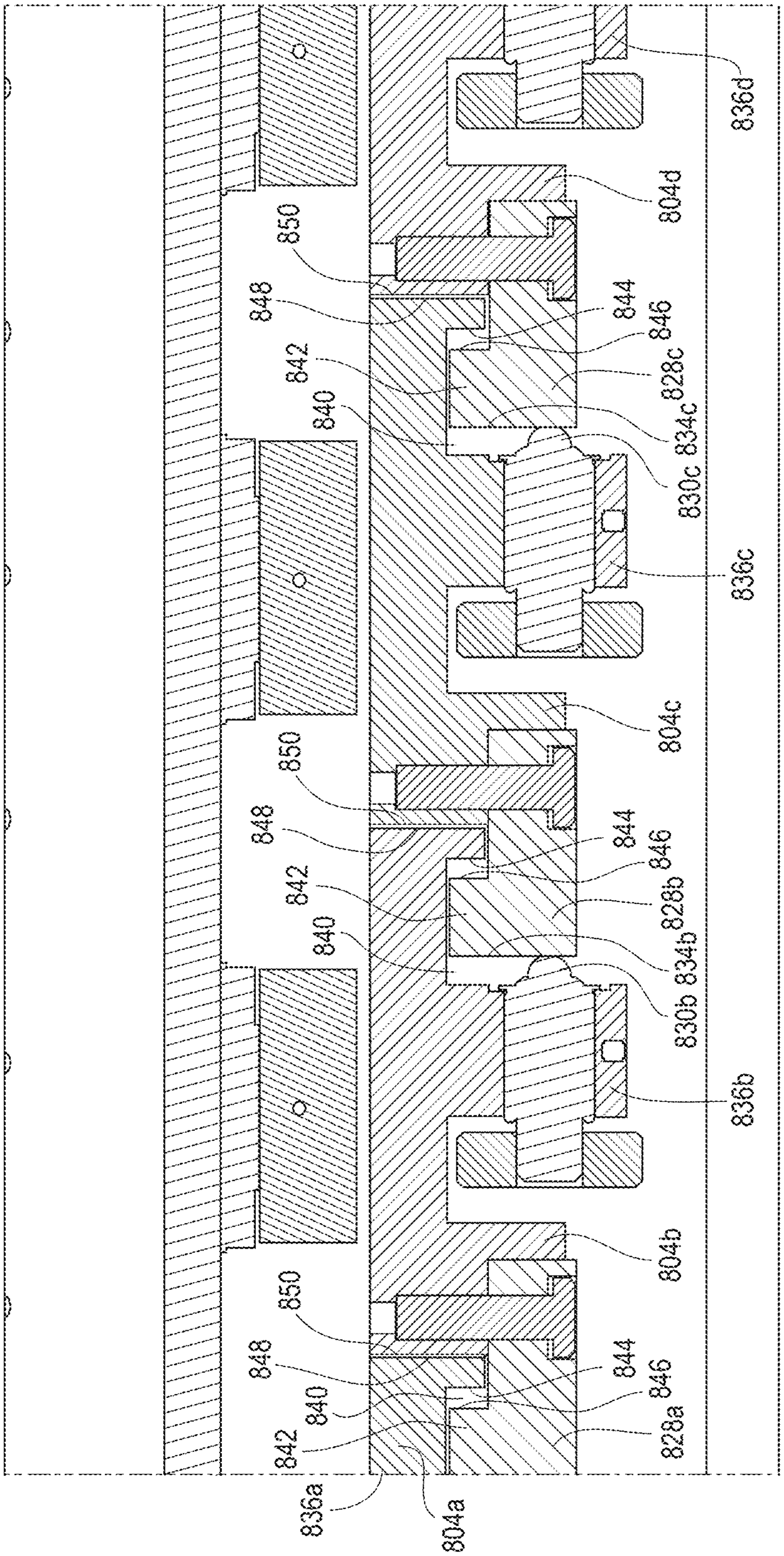
FIG. 21B is a cross-sectional view of taken generally along the lines 21B-21B of FIG. 21.

In addition, the second spacer block 836 includes a cavity 840 (FIG. 21B) into which an extension element 842 of the first spacer block 828 is disposed. The cavity 840 is defined and bounded on one side by a sidewall 844.

The printhead transport controller 658 (see FIGS. 19 and 20) operates the first and second linear actuators 824,826 to move the printhead holders 804 of the print unit 802 between print and maintenance positions.

In particular, to move the printhead holders 804 from the print position to the maintenance position, the printhead transport controller 658 operates the first and second linear actuators 824,826 (FIG. 21) simultaneously to retract the extension arms 825,827 thereof to move the first and second transport blocks 806,808 (and thus the printhead holders 804) away from one another until the first and second transport blocks 806,808 contact first and second mechanical stops 854,856, respectively. The first mechanical stop 854 is disposed between the transport block 806 and the first linear actuator 824 and the second mechanical stop 856 disposed between the second transport block 808 and the second linear actuator 826.

In addition, as the terminal printhead holder 804*a* is moved toward the first mechanical stop 854 because of the retraction of the extension arm 827, the sidewall 844 that defines the cavity 840 of the second spacer block 836*a* contacts a sidewall 846 of the extension element 842 of the first spacer block 828*a* (secured to the intermediate printhead holder 804*b*) thereby urges the intermediate printhead holder 804*b* to also move toward the first mechanical stop 854.

Similarly, as retraction of the extension arm 827 causes the terminal printhead holder 804*h* secured to the second transport block 808 to move toward the second mechanical stop 856, the sidewall 844 of the second spacer block 836*g* contacts the sidewall 846 of the extension element 842 of the first spacer block 828*h* of the terminal printhead holder 804*h*, and thereby urges the printhead holder 804*g* to move toward the second mechanical stop 856. In this manner, movement of the terminal printhead holders 804*a*,804*h* toward the first and second mechanical stops 854,856, respectively, causes intermediate printhead holders 804*b*-804*g* to become spaced apart. After the printhead holders 804 have been moved in this manner, the print unit 802 is in the maintenance position.

The distance adjacent print holders 804 are moved is determined by the space between the sidewalls 844 and 846 of the adjacent printhead holders 804 when the print unit 802 is in the print position 802 (i.e., when the projection 830 of one printhead holder 804 contacts the sidewall 834 of the printhead holder 804 adjacent thereto).

It should be apparent to one who has ordinary skill in the art, that instead of using interaction of the sidewalls 844 of the second spacer blocks 836 and the sidewalls 846 of the extension elements 842 to set the amount of space between the printhead holders 804 when the print unit 802 is in the maintenance position, the printhead holders 804 may be adapted to be coupled using the links or loops 652 (see FIGS. 19A,19B) described above to control the space therebetween when the print unit 802 is in the maintenance position.

The printhead holders 804 may be separated sufficiently when the print unit 802 is in the maintenance position so that a vacuum device, an air ejection device, cleaning fluid flushing device, and the like may be used to remove any ink and other debris deposited on the sidewalls of the printhead holders 804 and/or printheads 500. Further, having the print unit 802 in the maintenance position facilities removal and/or replacement of a printhead holder 804 and/or printhead 500 without such printhead holder 804 or printhead 500 contacting and thus possible damaging an adjacent printhead holder 804 or printhead 500.

In addition, in some embodiments, the positions of the first and second mechanical stops 854,856 and the dimensions of the cavity 840 in the second spacer block 836 and the extension element 842 of the first spacer block 828 are selected so that when the print unit 802 is in the maintenance position, the printhead holders 804 are separated such that each printhead holder 804 and the printhead 500 disposed therein is aligned with a corresponding cleaning device (not shown) that may be operated to clean the bottom face 512 and/or sidewalls of the printhead holder 804 and/or the printhead 500. Such cleaning device may include one or more wiper(s), one or more fluid ejection device(s), one or more vacuum device(s), a trough and/or a drain to capture purged ink and/or ejected fluid, and the like. In one embodiment, the separation between printhead holders 804 when the print unit 802 is in the maintenance position is approximately 0.065 inches. That is, the distance between a sidewall 848 of the second spacer block 836 and a sidewall 850 of an adjacent second spacer block 836 and that is proximate the sidewall 848 is approximately 0.065 inches.

In one embodiment, the first mechanical stop 854 includes a cylindrical head or bumper 858 fastened to one end of a screw 860, the screw 860 is journaled through and fastened to a block 862, and the block 862 is fastened to the central block 608 of the print unit 802.

Similarly, the second mechanical stop 856 includes a cylindrical head or bumper 866 fastened to one end of a screw 868 that is journaled through and fastened to a block 870, and the block 870 is fastened to the central block 608. In one embodiment, the bumpers 858,866 have a large (e.g., approximately 0.75 inch) diameter that absorbs mechanical energy and thus prevents shock to the printheads 500 or the printhead holders 804 when the first and second transport blocks 806,808 contact the bumpers 858,866, respectively.

To move the print unit 602 from the maintenance position to the print position, the printhead transport controller 658 operates the first and second linear actuators 824,826 to extend the extension arms 825,827 thereof to urge the first and second transport blocks 806,808 toward one another and thereby move the printhead holders 804 of the print unit 802 toward one another. The first and second transport blocks 806,808 are pushed in this manner until the projections 830-830*g* of printhead holders 804*a*-804*g* contact sidewalls 834*a*-834*g* of the first spacer blocks 828*a*-828*g* of the printhead holders 804*b*-804*h*, respectively.

Further, when the printhead holders 804 are in the print position, an inside wall 872 (FIG. 21) of the first side portion 818 of the stop block 814 contacts a third mechanical stop 874. Such contact between the inside wall 872 and the third mechanical stop 874 prevents further movement of the transport blocks 806,808 (and thus the printhead holders 804) away from the first linear actuator 824. The printhead transport controller causes additional movement of the printhead holders 804 toward one another is caused by operating the second linear actuator 826 to extend the extension arm 827 and thereby urge the printhead holders 804 away from the second linear actuator 826 and toward the first linear actuator 824. Thus, when in the print unit 802 is in the print position, the terminal printhead holder 804*a* is at a predetermined distance from the third mechanical stop 874 and the remaining printhead holders 804*b*-804*h* are at a predetermined distance from the terminal printhead holder 804*a* (and one another) as set by how much the projection 830 extends from the sidewall 832 of each second spacer block 836.

In some embodiments, the first and second linear actuators 824,826 are operated to apply different amounts of pressure on the transport blocks 806,808 when the print unit 802 is moved into the print position. In one embodiment, the first linear actuator 824 is operated to apply more pressure on the transport block 806 than the pressure applied by the linear actuator 826 on the transport block 808. Operating the first and second linear actuators 824,826 in this manner ensures that the inside wall 872 of the first side portion 818 of the stop block 814 is urged against the third mechanical stop 874 and thus the printhead 500*a* secured to the stop block 814 will be at a predetermined position relative to the third mechanical stop 874.

In some embodiments, the printhead transport controller 658 operates the first and second linear actuators 824,826 to continuously apply pressure to the transport blocks 806,808 while the print unit 802 is in the print position so the printhead holders 804 do not separate inadvertently.

In addition, the printhead transport controller 658 may adjust the pressure exerted by the first and second linear actuators 824,826 on the transport blocks 806,808 while the print unit 802 is in the print position to force the printhead holders 804 closer to one another or further apart to allow fine adjustment of the spacing between adjacent the printhead holders 804. It should be apparent to one who has ordinary skill in the art that forcing the printhead holders 804 closer to one another in this manner may temporarily compress the projections 830. Such adjustment of the spacing may be undertaken to adjust stitching between printheads 500, for example, to compensate for wear on the mechanical components of the print unit 802, dirt or loss of lubrication on the linear bearing rails 624,628, and the like.

The printhead holder 804 includes alignment mechanisms to facilitate aligning the printhead 500 relative to the substrate and a neighboring printhead 500. FIGS. 22-26 show such alignment mechanisms.

Referring to FIGS. 18 and 22-26, like the printhead holders 604, 612 (FIG. 18), the printhead holder 804 includes a first plate 900 and a second plate 902 and the printhead 500 is removably secured to the first plate 900. The first plate 900 and the second plate 902 are spaced apart and secured to one another by a plurality of compression springs 904 and leaf springs 906.

As described in greater detail below, a projection 908 extends from a wall 910 of the second plate 902 toward the first plate 900. As described in greater detail below, the projection 908 is journaled through a spacer 912, journaled through the second plate 902, and secured to a thumbwheel 914. Compression of the springs 904 urges the first and second plates 900,902 toward each other and thereby causes a wall 916 of the first plate 900 to maintain contact with the projection 908.

Rotating the thumbwheel 914 in a first direction causes the projection 908 to extend away from the wall 910 and thereby urge the first plate 900 (and the printhead 500) proximal the projection 908 to move away from the second plate 902. Because the plurality of leaf spring 906 also couples the first plate 900 and the second plate 902, such movement causes the leaf springs 906 to flex and the first plate 900 (and thus the printhead 500) to rotate in a first direction A about a pivot point 918 that is beyond the leaf spring 906.

Figure 18:
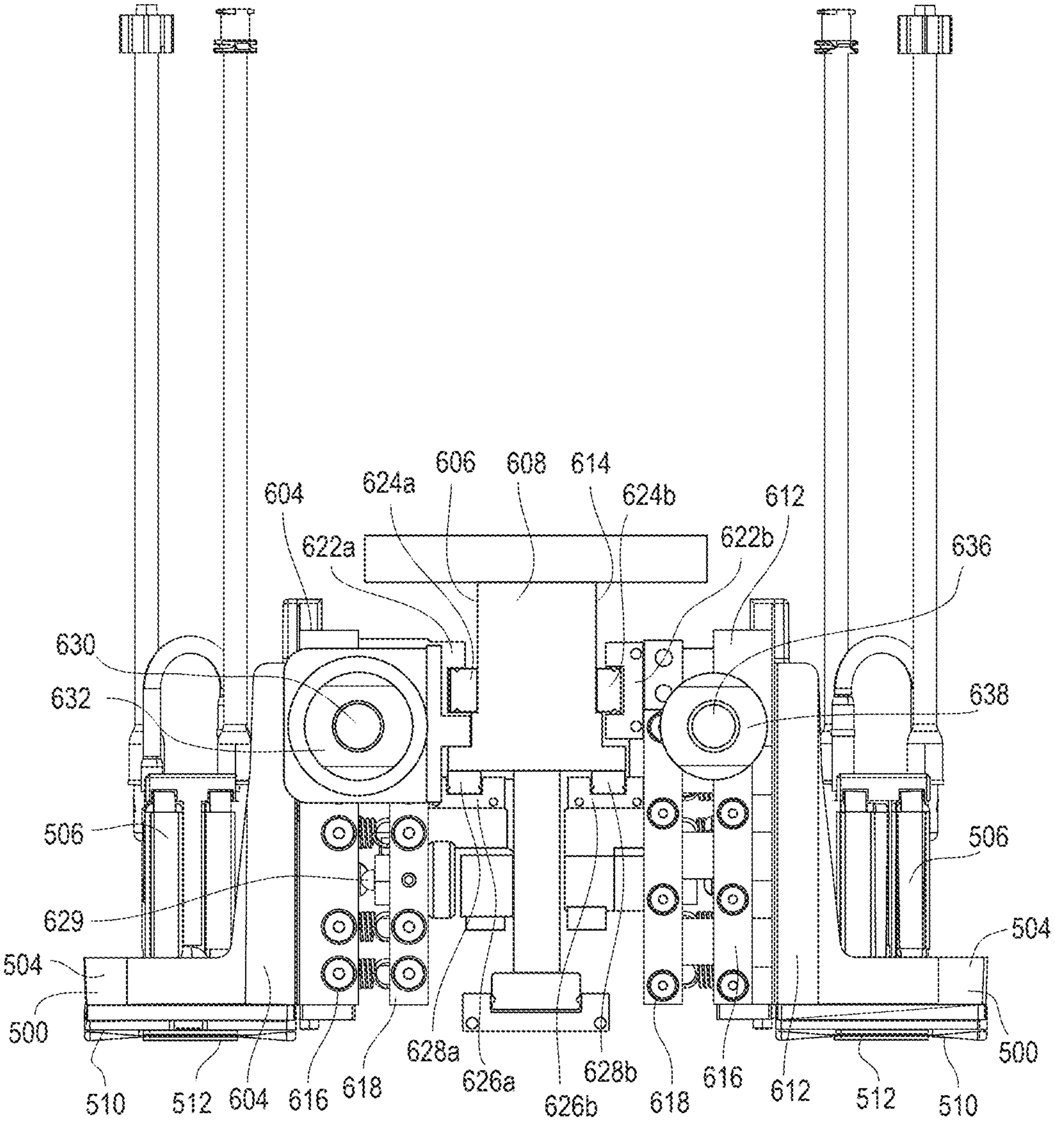
FIG. 18 is a cross-sectional view of the print module taken generally along the lines 18-18 of FIG. 15.

Rotating the thumbwheel 914 in a second direction opposite the first direction causes the projection 908 to retract toward the wall 910. Such retraction in combination with the compression of the springs 904 causes the first plate 900 proximal the projection 908 to move toward the second plate 902 and, because of the leaf springs 906, causes the first plate 900 (and thus the printhead 500) to rotate about the pivot point 918 in a second direction opposite the first direction A. Thus, the thumbwheel 914 may be used by an operator to align printheads 500 of the print unit 802 relative to one another and the central block 608 (FIG. 18).

Figure 25A:
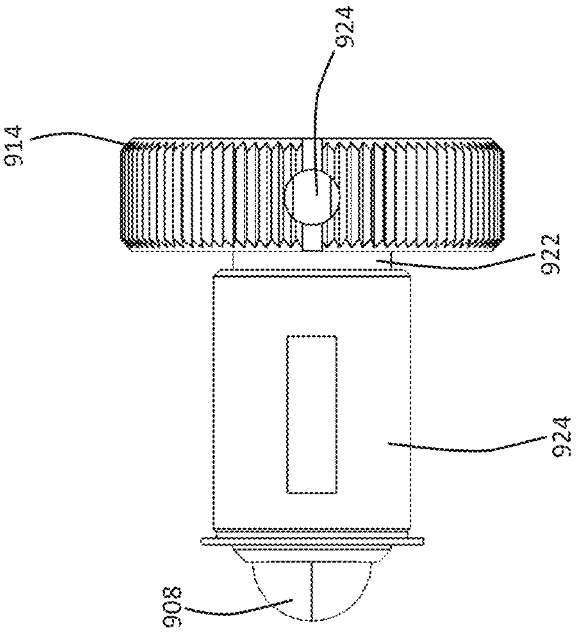
FIG. 25A is a side elevational view of a stop of the printhead holder of FIG. 25.
Figure 25:
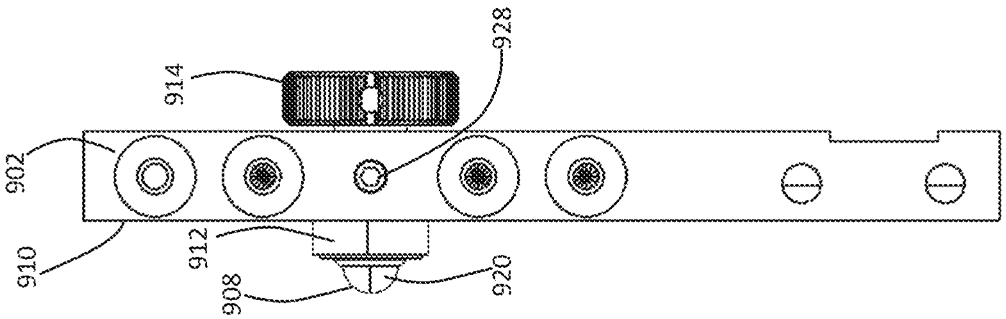
FIG. 25 is side elevational view of a portion of the printhead holder of FIG. 23.

FIGS. 25A and 25B show details of the projection 908. Referring also to FIGS. 25A and 25B, the projection 908 includes an end portion 920 disposed at one end of a finely threaded screw 922 that is screwed through a bushing or collar 924. The bushing 924 (and thus the screw 922) is journaled through the second plate 902, and a portion of the threaded screw 920 that extends beyond the bushing 924 is inserted into an orifice in the thumbwheel 914 and such portion is secured to the thumbwheel 914 by a setscrew 926. The bushing is secured to the plate 902 by a setscrew 928.

The predetermined distance between adjacent printheads 500 that is necessary for to accurately stitch print produced thereby is modified by adjusting an amount the projection 830 extends from the sidewall 832 of the second spacer block 836 secured to the second plate 902. The projection 830 is journaled through the second spacer block 836 and secured to a thumbwheel 926. The projection 830 is substantially identical to the projection 908 and is secured to the thumbwheel 926 in manner similar to how the projection 908 is secured to the thumbwheel 914, as described above in connection with FIGS. 23A and 23B. Rotating the thumbwheel 926 in a first direction causes the projection 830 to extend away from the sidewall 832 of the second spacer block 836 and toward the sidewall 834 of the first spacer block 828 of an adjacent printhead holder 804 and rotating the thumbwheel 926 in a second direction opposite the first direction causes the projection 830 to retract toward the sidewall 832.

In one embodiment, the finely threaded screw 922 that comprises the projections 830 and 908 includes approximately 254 threads per inch to allow fine adjustment of spacing and rotation between the printheads 500 so that print produced by adjacent printheads 500 is accurately stitched.

It should be apparent to one has ordinary skill in the art that the alignment features discussed in connection with the printhead holder 804 may be incorporated into the printhead holders 604.

Figure 26:
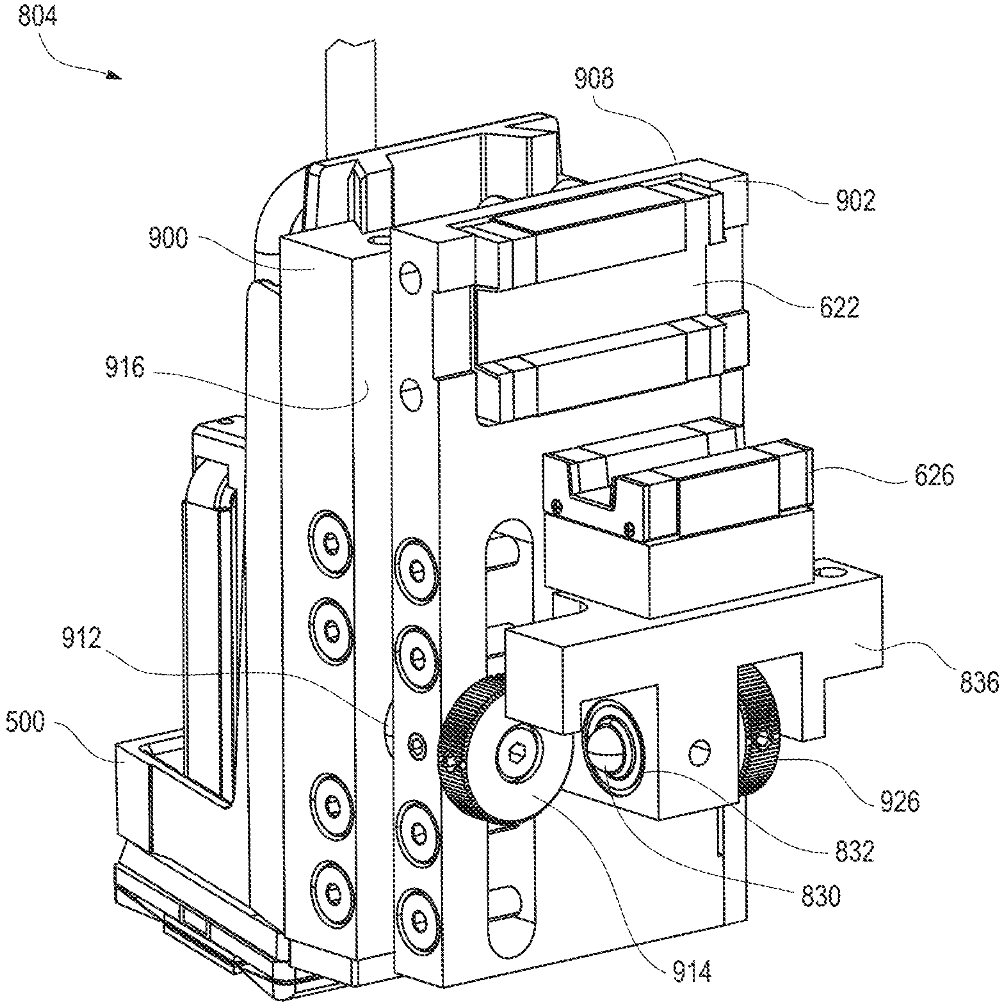
FIG. 26 is a top isometric view of the printhead holder and printhead of FIG. 23.

Referring to FIGS. 18 and 26, each printhead holder 804 includes first and second linear bearing blocks 622,626 that facilitate securement of the printhead holder 804 to the first and second linear bearing rails 624,628, respectively, of the central block 608 of the print unit, as described above in connection with FIGS. 15-19.

Similar to the print unit 201 (FIG. 12), the print units 602,610 of the embodiment 600 and the print units 802 of the embodiment 800 of the print module 200 are configured to be used with one or more printheads 500 that have first side edges 516 and second side edges 518 that are not parallel to the process direction 538. Further, these print units 602,610,802 may also be used with one or more printheads 500 that have first side edges 516 and/or second side edges 518 that are parallel to the process direction 538. For example, in addition to the Fuji Samba series of printheads discussed above in connection with the print unit 201, the print units 602,610,802 may be used with, for example, printheads sold by Kyocera Corporation of Kyoto, Japan, as part no. KJ4B-YH06WST-SL1V and the like.

Figure 27:
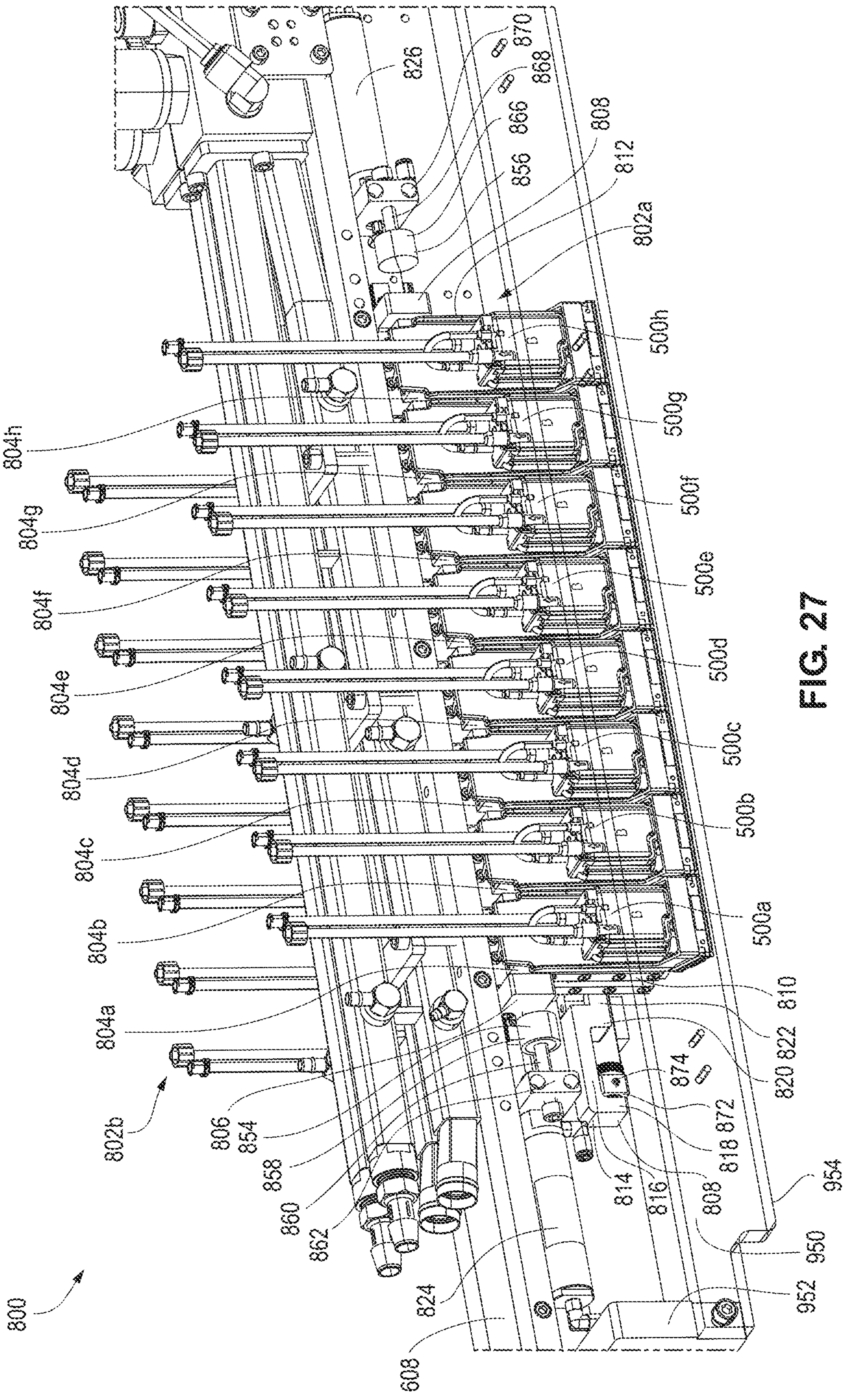
FIG. 27 is a top isometric view of the print module of FIG. 21.

FIG. 27 is substantially identical to FIG. 21 discussed above and shows a bar 950 that may be secured to a frame 952 of the print unit 802. A bottom edge 954 of the extends toward the substrate approximately 0.010 inches to 0.020 inches beyond the bottom faces 512 of the printheads 500. The bar 950 prevents contact between a substrate being printed on, defects in the substrate, and/or any debris that may be disposed on such substrate and the bottom faces 512 of the printheads 500.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

INDUSTRIAL APPLICABILITY

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A system for printing on a polymeric film web, comprising:

at least one rail;

a linear actuator;

first and second adjacent printhead holders slidably disposed on the at least one rail; and a projection extending from the first printhead holder toward the second printhead holder;

wherein operating the linear actuator causes the printhead holders to move between a first position in which the projection contacts the second printhead holder and a second position in which the projection is not in contact with the second printhead holder and the first and second printhead holders are separated by predetermined distances;

wherein a link slidably interconnects the first and second printhead holders wherein the link has an elongate opening with a length dimension and the predetermined distance is determined by the length dimension of the link opening.

2. The system of claim 1, further including an adjustment mechanism to adjust space between first and second printhead holders when the projection is in contact with the second printhead holder.

3. The system of claim 1, further including a printhead disposed on the first plate.

4. A system for printing on a polymeric film web, comprising:

at least one rail;

a linear actuator;

first and second adjacent printhead holders slidably disposed on the at least one rail; and a projection extending from the first printhead holder toward the second printhead holder;

wherein operating the linear actuator causes the printhead holders to move between a first position in which the projection contacts the second printhead holder and a second position in which the projection is not in contact with the second printhead holder and the first and second printhead holders are separated by predetermined distances;

wherein the first printhead holder includes a cavity defined by a first sidewall, the second printhead holder includes an extension element disposed in the cavity, and the predetermined amount is determined by a distance between the first and second sidewalls when projection is in contact with the second printhead holder.

5. The system of claim 4, wherein the linear actuator is operated to cause the first printhead holder to move toward linear actuator and movement of the first sidewall toward the linear actuator urges the second sidewall to move toward the linear actuator.

6. A system for printing on a polymeric film web, comprising:

at least one rail;

a linear actuator;

first and second adjacent printhead holders slidably disposed on the at least one rail; and a projection extending from the first printhead holder toward the second printhead holder;

wherein operating the linear actuator causes the printhead holders to move between a first position in which the projection contacts the second printhead holder and a second position in which the projection is not in contact with the second printhead holder and the first and second printhead holders are separated by predetermined distances;

wherein the linear actuator comprises a first linear actuator, further including a third printhead holder disposed on the at least one rail and a second linear actuator, and operating the first and the second linear operators to move the first and second printheads from the first position to the second position, wherein the first linear actuator moves the first printhead holders toward the first linear actuator and the second linear actuator moves the third printhead toward the second linear actuator.

7. The system of claim 6, wherein the projection comprises a first projections and further including operating the first and second linear actuators to move the first through third printheads from the second position to a third position in which first and second projections extending from the first and second printheads contact the second and third printheads, respectively.

8. The system of claim 7, wherein the first and second linear actuators are operated to apply different amounts of force when moving the printhead holders from the second position to the third position.

9. A system for printing on a polymeric film web, comprising:

at least one rail;

a linear actuator;

first and second adjacent printhead holders slidably disposed on the at least one rail; and a projection extending from the first printhead holder toward the second printhead holder;

wherein operating the linear actuator causes the printhead holders to move between a first position in which the projection contacts the second printhead holder and a second position in which the projection is not in contact with the second printhead holder and the first and second printhead holders are separated by predetermined distances;

wherein the first printhead holder comprises a first plate and a second plate coupled by one or both a compression spring and a leaf spring, further including an adjustment mechanism that determines the space between the first plate and the second plate.

10. The system of claim 9, wherein the adjustment mechanism rotates the first plate relative to the second plate.

11. A method for printing on a polymeric film web, comprising:

disposing first and second adjacent printhead holders slidably on at least one rail; and operating a linear actuator to move the first and second printhead holders between a first position in which a projection extending from the first printhead holder contacts the second printhead holder and a second position in which the projection is not in contact with the second printhead holder and the first and second printhead holders are separated by predetermined distances;

slidably interconnecting the first and second printhead holders with a link wherein the link has an elongate opening with a length dimension and the predetermined distance is determined by the length dimension of the link opening.

12. A method for printing on a polymeric film web, comprising:

disposing first and second adjacent printhead holders slidably on at least one rail; and operating a linear actuator to move the first and second printhead holders between a first position in which a projection extending from the first printhead holder contacts the second printhead holder and a second position in which the projection is not in contact with the second printhead holder and the first and second printhead holders are separated by predetermined distances; and further including disposing an extension element of the second printhead holder into a cavity of the first printhead holder, wherein the cavity is defined by a first sidewall and the extension member has a second sidewall, and the predetermined amount is determined by a distance between the first and second sidewalls when projection is in contact with the second printhead holder.

13. The method of claim 12, further including operating the linear actuator to cause the first printhead holder to move toward linear actuator and movement of the first sidewall toward the linear actuator urges the second sidewall to move toward the linear actuator.

14. A method for printing on a polymeric film web, comprising:

disposing first and second adjacent printhead holders slidably on at least one rail; and operating a linear actuator to move the first and second printhead holders between a first position in which a projection extending from the first printhead holder contacts the second printhead holder and a second position in which the projection is not in contact with the second printhead holder and the first and second printhead holders are separated by predetermined distances; and wherein the linear actuator comprises a first linear actuator, further including disposing a third printhead holder, and operating the first linear actuator and a second linear operator to move the first and second printheads from the first position to the second position, wherein the first linear actuator moves the first printhead holders toward the first linear actuator and the second linear actuator moves the third printhead toward the second linear actuator.

15. The method of claim 14, wherein the projection comprises a first projections and further including operating the first and second linear actuators to move the first through third printheads from the second position to a third position in which first and second projections extending from the first and second printheads contact the second and third printheads, respectively.

16. The method of claim 15, wherein operating the first and second linear actuators includes operating the first and second linear operators to apply different amounts of force when moving the printhead holders from the second position to the third position.

17. A method for printing on a polymeric film web, comprising:

disposing first and second adjacent printhead holders slidably on at least one rail; and operating a linear actuator to move the first and second printhead holders between a first position in which a projection extending from the first printhead holder contacts the second printhead holder and a second position in which the projection is not in contact with the second printhead holder and the first and second printhead holders are separated by predetermined distances; and wherein the first printhead holder comprises a first plate and a second plate, further including coupling the first plate and the second plate using one or both of a compression spring and a leaf spring, further including operating an adjustment mechanism to adjust the space between the first plate and the second plate and/or rotating the first plate relative to the second plate.

* * * * *